(12) United States Patent
Chung et al.

(10) Patent No.: US 8,842,617 B2
(45) Date of Patent: Sep. 23, 2014

(54) METHOD AND DEVICE FOR WIRELESS SUBFRAME RESOURCE ALLOCATION

(75) Inventors: Jae Hoon Chung, Gyeongki-do (KR); So Yeon Kim, Gyeongki-do (KR); Moon Il Lee, Gyeongki-do (KR); Kyu Jin Park, Gyeongki-do (KR); Hyun Soo Ko, Gyeongki-do (KR); Seung Hee Han, Gyeongki-do (KR); Yeong Hyeon Kwon, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 370 days.

(21) Appl. No.: 13/122,033

(22) PCT Filed: Oct. 1, 2009

(86) PCT No.: PCT/KR2009/005668
§ 371 (c)(1),
(2), (4) Date: Mar. 31, 2011

(87) PCT Pub. No.: WO2010/039011
PCT Pub. Date: Apr. 8, 2010

(65) Prior Publication Data
US 2011/0194523 A1    Aug. 11, 2011

Related U.S. Application Data

(60) Provisional application No. 61/157,168, filed on Mar. 3, 2009, provisional application No. 61/121,531, filed on Dec. 10, 2008, provisional application No. 61/113,210, filed on Nov. 10, 2008, provisional application No. 61/101,679, filed on Oct. 1, 2008.

(51) Int. Cl.
*H04W 72/04* (2009.01)
*H04L 5/00* (2006.01)
*H04L 1/00* (2006.01)
*H04L 1/18* (2006.01)

(52) U.S. Cl.
CPC ............. *H04L 5/0007* (2013.01); *H04L 1/0026* (2013.01); *H04L 1/1854* (2013.01); *H04L 5/0053* (2013.01); *H04W 72/0406* (2013.01)
USPC ........... 370/329; 370/330; 370/436; 455/450; 455/452.1

(58) Field of Classification Search
CPC ... H04J 4/00; H04J 2011/0016; H04W 48/12; H04W 48/17–48/18; H04W 48/20; H04W 72/04; H04W 72/048; H04W 72/14; H04W 72/1294
USPC ......... 370/341–345, 468, 280–281, 294–295, 370/310.1, 314, 329–330, 335–336, 431, 370/436, 466–467, 478–479; 375/340, 346, 375/260; 455/450–452.1
See application file for complete search history.

(56) References Cited

U.S. PATENT DOCUMENTS

| | | | | |
|---|---|---|---|---|
| 7,929,417 B2* | 4/2011 | Jung et al. | ...... | 370/210 |
| 8,005,175 B2* | 8/2011 | Yang et al. | ...... | 375/346 |
| 8,423,858 B2* | 4/2013 | Ahn et al. | ...... | 714/748 |
| 2006/0285601 A1* | 12/2006 | Julian et al. | ...... | 375/260 |
| 2008/0130570 A1* | 6/2008 | Jung et al. | ...... | 370/330 |
| 2008/0232495 A1 | 9/2008 | Yu et al. | | |
| 2008/0233966 A1 | 9/2008 | Scheim et al. | | |
| 2009/0069023 A1 | 3/2009 | Ahn et al. | | |
| 2009/0290597 A1* | 11/2009 | Baumgartner et al. | ....... | 370/468 |

FOREIGN PATENT DOCUMENTS

KR    2007-0027468    3/2007
KR    2008-0086317    9/2008

OTHER PUBLICATIONS

International Search Report from PCT/KR2009/005668.

* cited by examiner

*Primary Examiner* — Charles C Jiang
*Assistant Examiner* — Mohamed Kamara
(74) *Attorney, Agent, or Firm* — Morgan, Lewis & Bockius LLP

(57) ABSTRACT

The method for wireless resource subframe allocation comprises the following steps: allocation of the control channel based on the first RAT (Radio Access Technology) of the first control domain, which includes the OFDM symbol of the first number from the sub-frame containing multiple OFDM symbols and multiple subcarriers in the frequency domain; allocation of the control channel based on the second RAT of the second control domain including the OFDM symbol of the second number which follows said first control domain; and the allocation of a data channel in the data domain which includes the OFDM symbols positioned outside said first control domain and second control domain. This invention provides a sub-frame structure which is compatible with existing wireless communication systems. This method allows the continued use of existing control channel systems or base signal structures. The method is also capable of supporting advanced features.

8 Claims, 20 Drawing Sheets

METHOD AND DEVICE FOR WIRELESS SUBFRAME RESOURCE ALLOCATION

The present application is a national stage of PCT International Application No. PCT/KR2009/005668, filed Oct. 1, 2009, and claims the benefit of U.S. Provisional Application Nos. 61/101,679, filed Oct. 1, 2008, 61/113,210, filed Nov. 10, 2008, 61/121,531, filed Dec. 10, 2008 and 61/157,168, filed Mar. 3, 2009.

TECHNICAL FIELD

The present invention relates to wireless communication, and more particularly, to a radio resource allocation method for a subframe which is used in wireless communication systems.

BACKGROUND ART

In ITU-R (International Telecommunication Union Radio communication sector), a standardization task for IMT (International Mobile Telecommunication)-Advanced (i.e., the next-generation mobile communication system after the third generation) is being in progress. IMT-Advanced sets its goal to support IP (Internet Protocol)-based multimedia service at the data transfer rate of 1 Gbps in stop and slow-speed moving states and at the data transfer rate of 100 Mbps in a fast-speed moving state.

3GPP ($3^{rd}$ Generation Partnership Project) is a system standard to satisfy the requirements of IMT-Advanced and is preparing for LTE-A (Long Term Evolution-Advanced). LTE (Long Term Evolution) according the 3GPP (3rd Generation Partnership Project) standardization system is part of E-UMTS (Evolved-UMTS) which uses an E-UTRAN (Evolved-Universal Terrestrial Radio Access Network). The LTE adopts OFDMA (Orthogonal Frequency Division Multiple Access) in downlink and adopts SC-FDMA (Single Carrier-Frequency Division Multiple Access) in uplink. LTE-A (Advanced) has been improved from the LTE.

LTE-A may include new technique (e.g., a relay node and CoMP (Coordinated Multiple Point Transmit/Receive)) and can support an improved technique (e.g., MIMO extension in which the number of transmission antennas larger than the number of transmission antennas used in LTE is used).

There are factors that must be taken into consideration in this LTE-A. One of the factors is backward compatibility with terminals, a network, and so on which are designed to operate in the existing LTE. That is, it is preferred that LTE-A support terminals, a network, and so on designed to operate in the existing LTE so that they can operate in LTE-A. From this point of view, the design of a subframe structure (i.e., which radio resources will be allocated within a subframe) becomes problematic.

DISCLOSURE

Technical Problem

An object of the present invention is to provide a radio resource allocation method and apparatus for a subframe having backward compatibility with the existing wireless communication system.

Technical Solution

A radio resource allocation method for a subframe, including a plurality of OFDM symbols in the time domain and a plurality of subcarriers in the frequency domain, includes allocating a control channel to a first control zone, including a first number of first OFDM symbols, based on a first RAT (Radio Access Technology); allocating a control channel to a second control zone, including a second number of OFDM symbols placed after the first control zone, based on a second RAT; and allocating a data channel to a data zone including OFDM symbols placed other than the first control zone and the second control zone.

A PCFICH (Physical Control Format Indicator Channel) receivable by only a user equipment operated based on the second RAT may be further allocated to the first control zone. The PCFICH may include information informing the second number. The PCFICH may be placed in a specific zone fixed within the first control zone.

A base station includes a Radio Frequency (RF) unit configured to transmit and receive radio signals and a processor connected to the RF unit. The processor is configured to, in a subframe, including a plurality of OFDM symbols in the time domain and a plurality of subcarriers in the frequency domain, allocate a control channel to a first control zone, including a first number of first OFDM symbols, based on the first RAT, allocate a control channel to a second control zone, including a second number of OFDM symbols placed after the first control zone, based on the second RAT, and allocate a data channel to a data zone including OFDM symbols placed other than the first control zone and the second control zone.

Advantageous Effects

There is proposed a subframe structure providing backward compatibility with the existing wireless communication systems. The control channels or the reference signal structures of the existing system can be used, and improved characteristics can be supported.

BRIEF DESCRIPTION OF THE DRAWINGS

FIG. 12(b) shows a subframe structure from the standpoint of a relay station when the relay station receives signals from a BS;

MODE FOR INVENTION

The following technologies may be applied to a variety of radio access technologies, such as CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). The radio access technologies may be implemented using various radio communication standard systems. CDMA may be implemented using radio technologies, such as UTRA (Universal Terrestrial Radio Access) or CDMA2000. TDMA may be implemented using radio technologies, such as GSM (Global System for Mobile communications)/GPRS (General Packet Radio Service)/EDGE (Enhanced Data Rates for GSM Evolution). OFDMA may be implemented using radio technologies, such as IEEE 802.11 (Wi-Fi), IEEE 802.16 (WiMAX), IEEE 802-20, and E-UTRA (Evolved UTRA). UTRA is part of UMTS (Universal Mobile Telecommunications System). 3GPP (3rd Generation Partnership Project) LTE (Long Term Evolution) is part of an E-UMTS (Evolved-Universal Mobile Telecommunications System), and it adopts OFDMA in downlink and adopts SC-FDMA in uplink. LTE-A (LTE-Advance) is the evolution of LTE. An LTE system is a system based on 3GPP TS Release 8. An LTE-A system has backward compatibility with an LTE system.

For a clear description, 3GPP LTE/LTE-A are chiefly described, but the technical spirit of the present invention is not limited thereto. An LTE User Equipment (UE) is a UE supporting LTE, and an LTE-A UE is a terminal supporting LTE or LTE-A or both. However, they are only examples. An LTE UE may be represented by a first terminal supporting a first RAT (Radio Access Technology), and an LTE-A UE may be represented by a second terminal supporting a second RAT which provides backward compatibility with the first RAT. For example, the first RAT may become a transmission technology on a connection link between the base station and the macro terminal of a cell, and the second RAT may become a transmission technology on a connection link between the base station and the relay node of a cell. For another example, the first RAT may become a transmission technology providing compatibility with LTE, and the second RAT may become a transmission technology unique to LTE-A not providing compatibility with LTE. For yet another example, the first RAT may mean an LTE transmission technology, and the second RAT may mean an LTE-A transmission technology.

Figure 1:
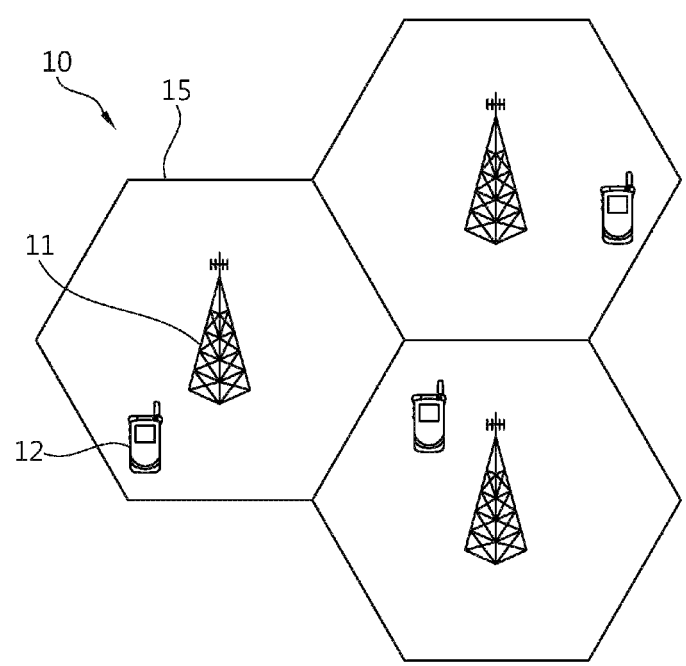
FIG. 1 shows a wireless communication system.

FIG. 1 shows a wireless communication system.

Referring to FIG. 1, the wireless communication system 10 includes at least one Base Station (BS) 11. Each BS 11 provides communication service to a specific geographical area 15 which is generally called a cell. The cell may be classified into a plurality of areas. Each area is called a sector. In general, the BS 11 refers to a fixed station communicating with a User Equipment (UE) 12. The BS 11 may also be called another terminology, such as an eNB (evolved NodeB), a BTS (Base Transceiver System), an access point, or an AN (Access Network). The BS 11 may perform functions, such as connectivity, management, control, and resource allocation with the UE 12.

The UE 12 may be fixed or mobile and may also be called another terminology, such as an MS (Mobile Station), an UT (User Terminal), an SS (Subscriber Station), a wireless device, a PDA (Personal Digital Assistant), a wireless modem, a handheld device, or an AT (Access Terminal). Hereinafter, downlink (DL) refers to communication from the BS 11 to the UE 12, and uplink (UL) refers to communication from the UE 12 to the BS 11.

Figure 2:
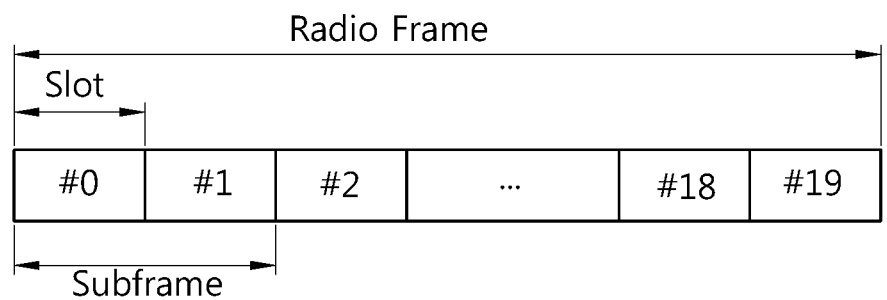
FIG. 2 shows an FDD (Frequency Division Duplex) radio frame structure of a 3GPP LTE system.

FIG. 2 shows an FDD (Frequency Division Duplex) radio frame structure of a 3GPP LTE system. For the FDD radio frame structure, reference can be made to Section 4.1 of 3GPP TS 36.211 (V8.3.0) "Technical Specification; Evolved Universal Terrestrial Radio Access (E-UTRA); Physical Channels and Modulation (Release 8)". In the FDD mode, downlink transmission and uplink transmission are separated from each other in the frequency domain.

Referring to FIG. 2, a radio frame includes 10 subframes. One subframe includes two slots. For example, the length of one subframe may be 1 ms, and the length of one slot may be 0.5 ms. The slot may be composed of 7 OFDM (Orthogonal Frequency Division Multiplexing) symbols in a normal CP (Cyclic Prefix) and may be composed of 6 OFDM symbols in an extended CP.

Figure 3:
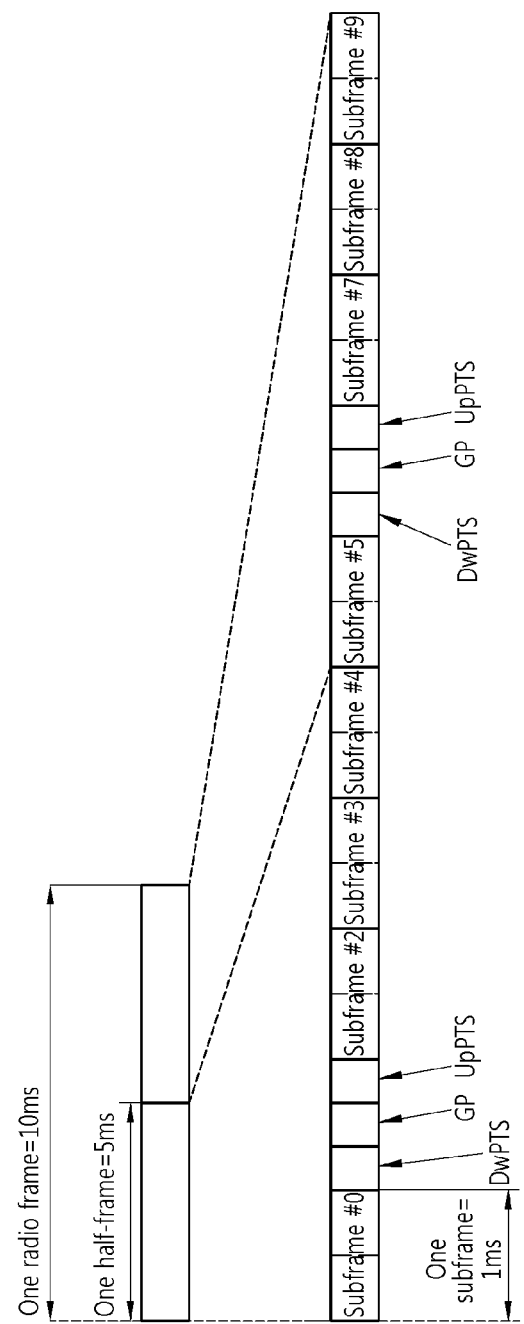
FIG. 3 shows a TDD (Time Division Duplex) radio frame structure of a 3GPP LTE system.

FIG. 3 shows a TDD (Time Division Duplex) radio frame structure of a 3GPP LTE system. For the TDD radio frame structure, reference can be made to Section 4.2 of 3GPP TS 36.211 (V8.3.0).

Referring to FIG. 3, a radio frame includes two half-frames. Each half-frame includes 5 subframes.

The division of uplink and downlink is based on each subframe, and an uplink subframe and a downlink subframe are separated by a switching point. The switching point is an area for separating uplink and downlink between an uplink subframe and a downlink subframe. A radio frame includes at least one switching point. The switching point includes a DwPTS (Downlink Pilot Time Slot), a GP (Guard Period), and an UpPTS (Uplink Pilot Time Slot). The DwPTS is used for initial cell search, synchronization, or channel estimation. The UpPTS is used for channel estimation in a BS and for uplink transmission synchronization of a UE. The GP is used to remove interference occurring in uplink because of multi-path delay of a downlink signal between uplink and downlink.

The radio frame structures of FIGS. 2 and 3 are only illustrative, and the number of subframes included in the radio frame or the number of slots included in the subframe may be changed in various ways.

Figure 4:
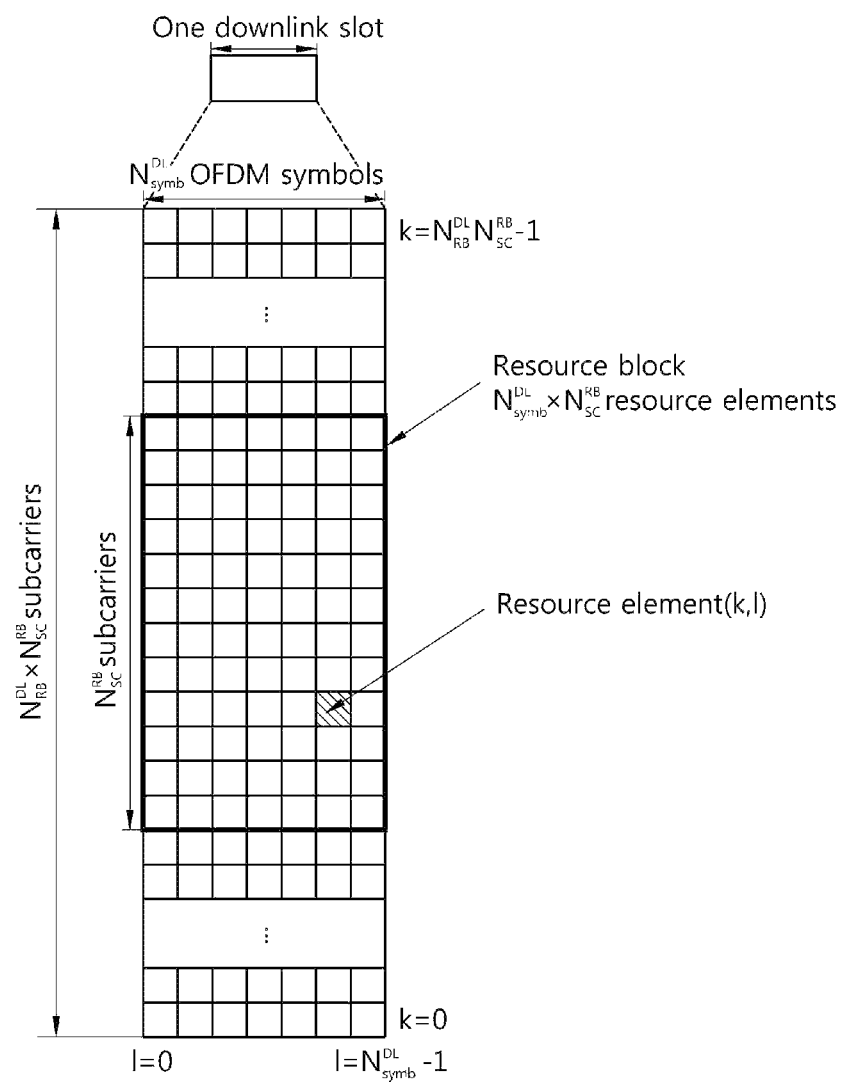
FIG. 4 is an exemplary diagram showing a resource grid for one slot.

FIG. 4 is an exemplary diagram showing a resource grid for one slot.

Referring to FIG. 4, a slot (e.g., a downlink slot included in a downlink subframe) includes a plurality of OFDM symbols in the time domain. Here, one downlink slot is illustrated to include 7 OFDM symbols and one resource block is illustrated to include 12 subcarriers in the frequency domain, but not limited thereto.

Each of elements on the resource grid is called a resource element. One resource block includes 12×7 resource elements. The number of resource blocks $N^{DL}$ included in a downlink slot depends on a downlink transmission bandwidth configuration in a cell.

Figure 5:
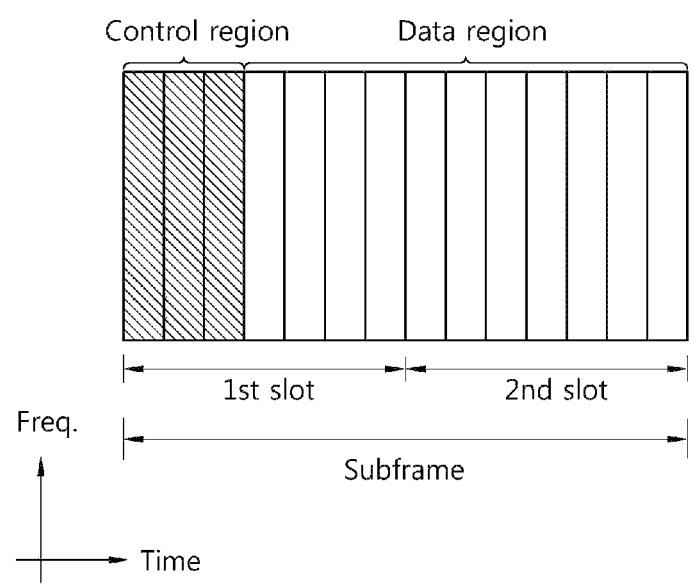
FIG. 5 shows an example of a downlink subframe structure used in LTE.

FIG. 5 shows an example of a downlink subframe structure used in LTE.

Referring to FIG. 5, a subframe includes two slots. A maximum of 3 OFDM symbols of a first slot within the subframe correspond to a control region to which control channels are allocated, and the remaining OFDM symbols correspond to a data region to which PDSCHs (Physical Downlink Shared Channels) are allocated.

Downlink control channels used in LTE include a PCFICH (Physical Control Format Indicator Channel), A PHICH (Physical Hybrid-ARQ Indicator Channel), and a PDCCH (Physical Downlink Control Channel). The PCFICH transmitted in the first OFDM symbol of a subframe carries information about the number of OFDM symbols (i.e., the size of a control region) which are used to transmit control channels within the subframe.

The PHICH carries an ACK (Acknowledgement)/NACK (Not-Acknowledgement) signal for an uplink HARQ (Hybrid Automatic Repeat Request). That is, the ACK/NACK signal for uplink data transmitted by a UE is transmitted on the PHICH. A PHICH duration means the number of OFDM symbols which can be used to transmit the PHICH.

The PDCCH may carry information about the resource allocation and a transmission format of a DL-SCH (Downlink Shared Channel), resource allocation information about an UL-SCH (Uplink Shared Channel), paging information about a PCH, system information about a DL-SCH, information about resource allocation for a higher layer control message, such as a random access response transmitted on a PDSCH, information about a set of transmission power control commands for respective UEs within a certain UE group, and information about the activation of a VoIP (Voice over Internet Protocol). A plurality of PDCCHs may be transmitted within the control region, and a UE can monitor the plurality of PDCCHs. The PDCCHs are transmitted on one CCE (Control Channel Element) or on an aggregation of several contiguous CCEs. The CCE is a logical allocation unit used to provide a PDCCH with the coding rate according to the state of a radio channel. The CCE corresponds to a plurality of resource element groups. A format of a PDCCH and the number of bits of the PDCCH are determined according to a correlation between the number of CCEs and the coding rate provided by CCEs. Control information transmitted through the PDCCH is called Downlink Control Information (DCI). The DCI indicates uplink resource allocation information, downlink resource allocation information, and an uplink transmission power control command for specific UE groups.

The following table shows pieces of DCI according to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

The DCI format 0 indicates uplink resource allocation information, the DCI formats 1 to 2 indicate pieces of downlink resource allocation information, and the DCI formats 3 and 3A indicate uplink TPC (Transmit Power Control) commands for specific UE groups.

A BS determines a PDCCH format according to DCI to be transmitted to a UE and attaches CRC (Cyclic Redundancy Check) to the DCI. A unique identifier (called an RNTI (Radio Network Temporary Identifier)) is masked to the CRC according to the owner or use of a PDCCH. If a PDCCH is for a specific UE, a unique identifier (e.g., a C-RNTI (Cell-RNTI)) of the UE may be masked to the CRC.

Space for searching a PDCCH within the control zone is called a search space. An aggregation of PDCCH candidates being monitored is defined according to the search space. Assuming that an aggregation of all CCEs for a PDCCH within one subframe is a CCE aggregation, the search space is an aggregation of contiguous CCEs which are started at a specific start point within the CCE aggregation based on a CCE aggregation level. The CCE aggregation level is a CCE unit for searching a PDCCH, and the size of the CCE aggregation level is defined by the number of contiguous CCEs. The CCE aggregation level also means the number of CCEs used to transmit a PDCCH. The search space is defined according to the CCE aggregation level. The positions of PDDCH candidates are generated for every size of the CCE aggregation level within the search space.

The search space may be classified into a common search space and a UE-specific search space. The common search space is monitored by all UEs within a cell, and the UE-specific search space is monitored by a specific UE. A UE monitors the common search space or the UE-specific search space or both based on control information to be received. The number of CCE aggregation levels supported by the common search space is smaller than the number of CCE aggregation levels supported by the UE-specific search space. The common search space and the UE-specific search space may overlap with each other.

A reference signal (RS) is used for channel estimation. Channel estimation is necessary for user scheduling or data demodulation or both. The RS is a signal known to both a transmitter and a receiver and is also called a pilot. The RS may be divided into a common RS and a dedicated RS. The common RS is a reference signal transmitted to all UEs within a cell and is used for channel estimation. The dedicated RS is a reference signal received by a specific UE or a specific UE group within a cell and is chiefly used for a specific UE or a specific UE group to demodulate data.

Figure 6:
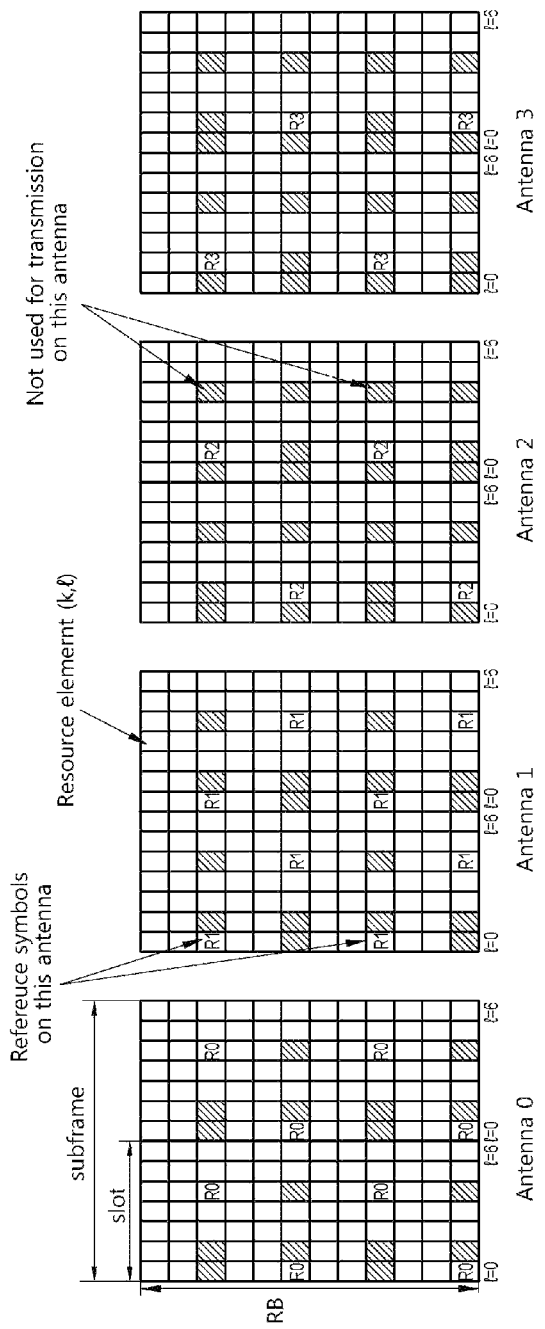
FIG. 6 shows an example of a common reference signal structure when four antennas are used in 3GPP LTE.

FIG. 6 shows an example of the structure of a common RS when 4 antennas are used in 3GPP LTE. For the structure of the common RS, reference can be made to Section 6.10.1 of 3GPP TS 36.211 V8.2.0 (2008-03). 'R0' indicates a reference signal for a first antenna, 'R1' indicates a reference signal for a second antenna, 'R2' indicates a reference signal for a third antenna, and 'R3' indicates a reference signal for a fourth antenna. Positions within the subframes of R0 to R3 do not overlap with each other. l indicates the position of an OFDM symbol within a slot and has a value between 0 and 6 in the normal CP. In one OFDM symbol, a reference signal for each antenna is positioned at intervals of 6 subcarriers. The number of R0s is the same as the number of R1s within the subframe, and the number of R2s is also the same as the number of R3 within the subframe. The number of R2s or R3s within the subframe is smaller than the number of R0s or R1s. A resource element used in the reference signal of one antenna is not used in the reference signals of other antennas in order to prevent interference between the antennas.

A subframe structure providing backward compatibility with an LTE UE is described below.

An LTE UE performs measurement using an RS in all downlink subframes. If an erroneous RS is received in a downlink subframe, an LTE UE may transmit an erroneous downlink channel state to a BS. Furthermore, an LTE UE receives a downlink/uplink grant in the control region of a downlink subframe. If a downlink/uplink grant is not received, an LTE UE cannot receive downlink data and also cannot transmit uplink data. In order to provide an LTE UE with backward compatibility, the existing control region in a new subframe structure needs to be taken into consideration.

LTE-A may need a new subframe structure having a different form from the subframe structure of LTE in designing the subframe structure owing to the improved technology (e.g., MIMO using an extended number of antennas) and the newly introduced characteristic (e.g., a relay node and CoMP (Coordinated Multiple point Tx/Rx)). LTE-A should guarantee backward compatibility with LTE. Accordingly, in designing the structure of a new subframe for LTE-A, an LTE UE needs to be able to be normally operated in the new subframe. As a scheme for supporting backward compatibility, there is a method using an MBSFN (Multicast Broadcast Single Frequency Network) subframe for transmitting MBMS (Multimedia Broadcast Multicast Service) designed in the conventional LTE. In the MBSFN subframe, at least one of 10 subframes constituting a radio frame is set for an MBSFN use. To set at least one subframe for the MBSFN use means that an LTE UE attempts to detect a PDCCH in the control region, but does not perform downlink channel estimation in the data region. LTE-A may need a new PDCCH or reference signal structure, not the structure or disposition of the existing PDCCH or the existing RS within a subframe because of the improved technology or the newly introduced characteristic.

A new subframe structure for providing backward compatibility in a system in which LTE and LTE-A coexist is described below.

Figure 7:
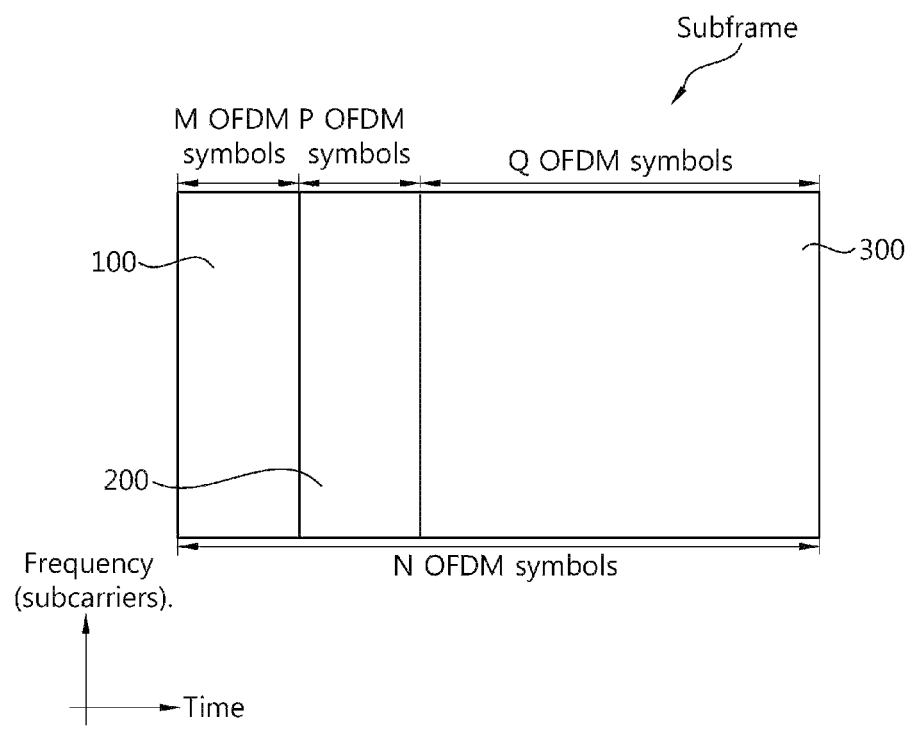
FIG. 7 shows an example of radio resource allocation for a subframe according to an embodiment of the present invention.

FIG. 7 shows an example of radio resource allocation for a subframe according to an embodiment of the present invention.

Referring to FIG. 7, a subframe includes N OFDM symbols in the time domain and includes a plurality of subcarriers in the frequency domain. The subframe is classified into three zones, including a first control zone 100, a second control zone 200, and a data zone 300 in the time domain. The three zones have been subjected to TDM (Time Division Multiplexing). The first control zone 100 includes first M OFDM symbols from among the N OFDM symbols, the second control zone 200 includes P OFDM symbols subsequent to the first control zone, and the data zone 300 includes the remaining Q (Q=N−M−P) OFDM symbols. M or P may have any one value of 1, 2, and 3. The number of OFDM symbols included in each of the three zones is not limited, may be fixed or varied according to a system. Furthermore, the positions and sequence of the three zones are illustrative and may be changed. The first control zone to the second control zone may be basically defined as the entire system band (i.e., a specific component carrier band), the entire frequency band of FA (Frequency Allocation), or the IFFT (Inverse Fast Fourier Transform)/FFT (Fast Fourier Transform) size of an OFDMA system. However, the first control zone to the second control zone may be defined as a physical resource zone which is designated as some frequency band region within the system band designated in a specific BS.

The first control zone 100 may include an RS and a control channel according to the first RAT. For example, the first control zone 100 may include an RS and a control channel for providing reception demodulation and channel measurement for LTE UEs. The control channel for LTE UEs may include at least one of PDCCHs not associated with a PHICH, a PCFICH, and a PDSCH. Here, the PDCCH not associated with the PDSCH means a PDCCH other than PDCCHs, including radio resource allocation information about a PDSCH within a relevant subframe and control information about a multiplexing scheme (when a PDSCH within a relevant subframe is not allocated for LTE UEs). That is, the first control zone 100 may be allocated to measure a channel through the RS of an LTE UE and to receive control channels including a control signal. In addition, the PDCCH associated with the PDSCH may also be transmitted in the first control zone 100 according to specific circumstances to which the proposed subframe structure is applied. For example, when the PDSCH for LTE UEs is allocated within a subframe, the PDCCH associated with the PDSCH may also be transmitted.

The second control zone 200 may include an RS and a control channel according to the second RAT. For example, the second control zone 200 may include an RS and a control channel (e.g., at least one of a PHICH, a PCFICH, and a PDCCH) which support reception demodulation and channel measurement for LTE-A UEs. In the control channel for LTE-A UEs, the PCFICH is a control channel to designate the range (e.g., the number of OFDM symbols (the P value in FIG. 7) or a transmission band region on the frequency domain) of physical transmission resources which may be used to transmit an RS or a control channel or both for LTE-A UEs. The PDCCH is a control channel, including cell-common or UE-specific control information which is related to PDSCH reception to which the feature of an LTE-A UE has been applied.

The P value, indicating the number of OFDM symbols related to the physical signal transmission of the second control zone 200 (i.e., the physical signal transmission of a control channel, such as a PDCCH or a PHICH or both, and an RS) is static. The P value may have any one value of 1, 2, and 3. In an alternative, the P value may be transmitted to an LTE-A UE through a higher layer signal, such as an RRC (Radio Resource Control) signal, or through a BCCH (Broadcast Control Channel) for each cell or system. In another alternative, the P value may be transmitted to an LTE-A UE by using the designated resources of the second control zone 200 through the same channel (i.e., an independent L1 control channel) as the PCFICH of LTE. In yet another alternative, a channel can be defined to inform the number of OFDM symbols (or a transmission resource zone including designating a frequency resource zone) of the second control zone 200, like the same channel form as the PDCCH of an LTE UE using CCEs in the first control zone 100. In this case, both a method of identifying the P value using one designated RNTI and a method of using an additional dedicated indication channel having the same channel form as the PCFICH of an LTE UE may be used. The method of identifying the P value using one designated RNTI may be transmitted by mapping the P value to a common search space. Here, the designated RNTI is a common RNTI.

FIG. 7 shows an example in which the first control zone 100 and the second control zone 200 are contiguous to each other, but not limited thereto. That is, unlike in FIG. 7, the second control zone 200 may be differently positioned according to the feature of LTE-A. For example, the second control zone 200 may not be contiguous to the first control zone 100 from among the N–M OFDM symbols. Furthermore, the second control zone 200 is not limited to a zone including consecutively contiguous OFDM symbols. For example, the second control zone 200 may include a specific number of separated zones. In this case, control information or a physical signal may be allocated to each of the separated zones according to their attributes.

An RS and a data channel for LTE-A UEs may be allocated to the data zone 300. The RS for LTE-A UEs supports the demodulation/decoding and measurement of the LTE-A UEs in relation to data channel transmission, and they may be mapped to radio resources in a different pattern from an RS for LTE UEs based on the new characteristic of LTE-A. The RS for LTE-A UEs is mapped to a specific frequency domain on specific one or more OFDM symbols in the second control zone 200 and the data zone 300 and then transmitted. In addition, a data channel and an RS for LTE UEs may be defined according to specific circumstances to which the proposed subframe structure is applied.

In the data channel (i.e., PDSCH) for LTE-A UEs, data is transmitted in a format on the subframe materialized according to the new characteristic of LTE-A. A transport block size (TBS) transmitted in the PDSCH for LTE-A UEs is the same as that of a downlink subframe used in LTE, but a method of matching the transport block size with the number of modulation symbols of the corresponding subframe through a rate matching process may be used. In an alternative, the transport block size transmitted in the PDSCH for LTE-A UEs may have a different value from that of a downlink subframe used in LTE. For example, the transport block size may be determined according to an MCS (Modulation Coding Scheme) and the number of allocated PRBs (Physical Resource Blocks).

The radio resource allocation method for a subframe described with reference to FIG. 7 may be applied to LTE-A in which PDSCHs are transmitted by using the number of transmission antennas more extended than the number of transmission antennas used in LTE. The above-described radio resource allocation method for a subframe may be used in the same way, unless otherwise described.

In LTE-A, PDSCHs can be transmitted by using a greater number of transmission antennas than that of LTE. Even in this case, the fact that an LTE UE must be able to normally measure a reference signal or the fact that an LTE UE must be able to receive a PHICH for maintaining the HARQ timing relationship synchronized on HARQ or both have to be taken into consideration in order to guarantee backward compatibility. In order for LTE UEs to perform reception demodulation and channel measurement by estimating an RS through the first control zone 100, a PHICH is transmitted as the RS or a control channel or both for the LTE UEs.

The second control zone 200 may include an RS or a control channel or both for LTE-A UEs. The RS for LTE-A UEs is a reference signal for an extended number of transmission antenna ports, and the control channel for LTE-A UEs may include at least one of a PDCCH and a PHICH which are related to a PDSCH to be transmitted to the LTE-A UEs in the data zone. The RS or the control channel or both for LTE-A UEs are included in the second control zone 200 so that they do not influence the transmission of the RS for LTE UEs or the PHICH or both.

The RS for LTE-A UEs is mapped to a specific frequency domain on specific one or more OFDM symbols in the second control zone 200 and the data zone 300 and then transmitted. The RS for LTE-A UEs is used for the LTE-A UEs to perform demodulation or channel measurement or both for PDSCH transmission using an extended number of transmission antennas.

A method of informing a relay node of a P value, indicating the number of OFDM symbols regarding the second control zone 200, and a method of determining a transport block size (TBS) through a PDSCH transmitted to a relay node may use the method of informing a P value of an LTE-A UE and the method of determining a transport block size (TBS) through a PDSCH transmitted to an LTE-A UE, described above with reference to FIG. 7.

In a subframe in which a PDSCH is transmitted using an extended number of transmission antennas as compared with LTE, the second control zone 200 may be divided into zones. For example, the second control zone 200 may be divided into a zone, including a specific number of first OFDM symbols in the (N–M) OFDM symbol section, and a zone, including a specific number of latter OFDM symbols. The second control zone 200 may be divided into zones according to the characteristic of a BS that transmits a signal by using an extended number of transmission antennas as compared with LTE. In other words, a physical signal and control information transmitted through the second control zone 200 may be transmitted through separated zones according to their attributes. For example, a PDCCH transmitted to an LTE-A UE may be transmitted through a zone including a specific number of first OFDM symbols, and a PHICH transmitted to the LTE-A UE may be transmitted through a zone including a specific number of latter OFDM symbols. In this case, an RS for LTE-A UEs may be defined in a specific pattern in the second control zone 200 and the data zone 300.

The above-described radio resource allocation method for a subframe may also be used even when a wireless communication system includes relay stations.

Figure 8:
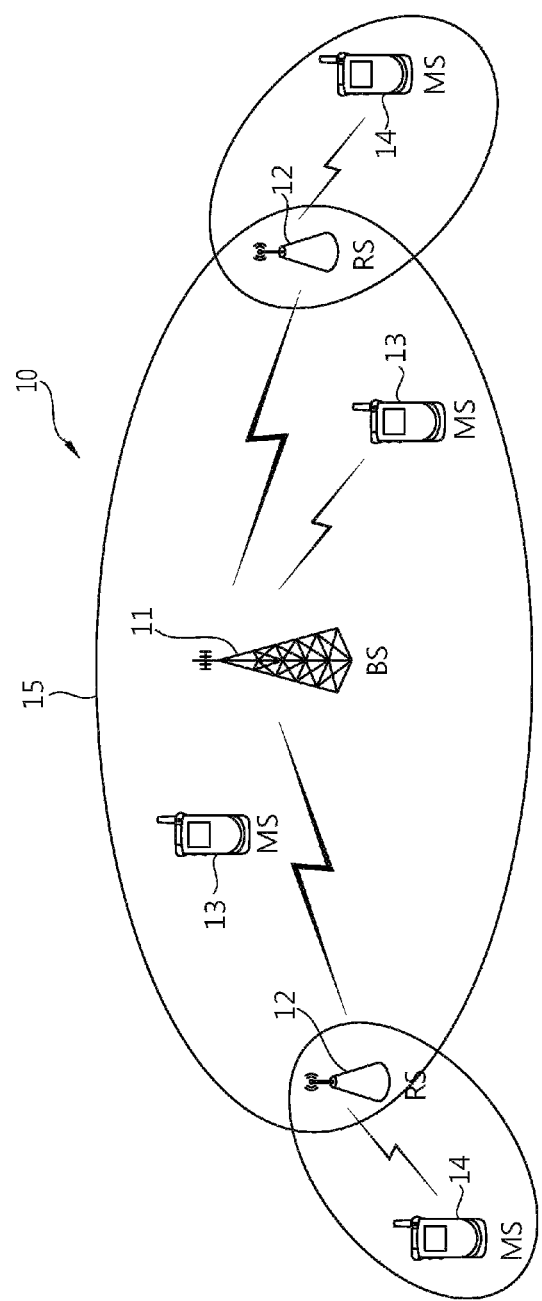
FIG. 8 shows a wireless communication system including relay stations.

FIG. 8 shows a wireless communication system including relay stations. The relay station (RS) 12 refers to equipment relaying signals between a BS 11 and a UE 14. The relay station may also be called another terminology, such as an RN (Relay Node), a repeater, or a relay node.

The relay stations may be classified into several forms according to their functions as in Table 2 below.

TABLE 2

| function | L1 Relay | L2 Relay | L3 Relay | Pico/Femto Cell |
|---|---|---|---|---|
| RF function | X | X | X | X |
| Coder/Decoder and CRC | — | X | X | X |
| HARQ | — | X | X | X |

TABLE 2-continued

| function | L1 Relay | L2 Relay | L3 Relay | Pico/Femto Cell |
|---|---|---|---|---|
| Multiplex & Demultiplex of MAC SDU | — | X | X | X |
| Priority(Qos) handling | — | X | X | X |
| Scheduling | — | X | X | X |
| Outer ARQ | — | (X) | X | X |
| (Re)-Segmentation and concatenation | — | (X) | X | X |
| Header compression(ROHC) | — | — | — | X |
| Reordering of lower layer SDUs | — | — | — | X |
| In-sequence delivery of upper layer PDUs | — | — | — | |
| Duplicate detection of lower layer SDUs | — | — | — | X |
| Ciphering | — | — | — | X |
| System information broadcast | — | — | X | X |
| RRC Connection set-up and maintenance | — | — | X | X |
| Radio Bearers set-up and maintenance | — | — | — | X |
| Mobility function | — | — | X | |
| MBMS services control | — | — | — | X |
| Paging | — | — | — | X |
| Qos management | — | — | (X) | X |
| UE measurement reporting and control the reporting | — | — | (X) | X |
| NAS signalling handling | — | — | — | X |

In Table 2, 'X' means that a relevant function is supported, '(X)' means that a relevant function may be supported, and '-' means that a relevant function is not supported. In Table 2, the relay stations are classified into an L1 relay station, an L2 relay station, and an L3 relay station, but they are exemplary. The relay stations are classified according to the schematic characteristics of the L1, L2, and L3 relay stations, but they do not necessarily comply with terms. For reference, the functions of a femto cell or a pico cell are also illustrated in Table 2. It is assumed that the femto cell or the pico cell supports all the functions illustrated in Table 2. The L1 relay station is a relay station having some additional function together with AF (Amplify and Forward; forward after amplification). The L1 relay station amplifies a signal received from a BS or a UE and transfers the signal to the UE or the BS. Hereinafter, the L1 relay station refers to a relay station which cannot perform an independent scheduling function. The L2 relay station is a relay station having a scheduling function together with DF (Decoding and Forward; forward after decoding). The L2 relay station restores a signal, received from a BS or a UE, to information through processes, such as demodulation and decoding, generates a signal through processes, such as coding and modulation, and then transfers the signal to the UE or the BS. The L3 relay station is a relay station having a similar form to one cell, and it supports call access, release, and mobility functions together with the functions of the L2 relay station.

A relay station to which the technical spirit of the present invention is applied may be applied to any one of the L1 relay station, the L2 relay station, and the L3 relay station, but not limited thereto.

A UE may be classified into a macro UE (Ma UE) 13 and a relay UE (Re UE) 14. Here, the macro UE 13 refers to a UE directly communicating with the BS 11, and the relay UE 14 refers to a UE communicating with a relay station. Although the macro UE 13 exists within the cell of the BS 11, it can communicate with the BS 11 via the relay station (RS) 12 in order to improve the transfer rate according to the diversity effect. The macro UE 13 or the relay UE 14 or both may include an LTE UE or an LTE-A UE.

Figure 9:
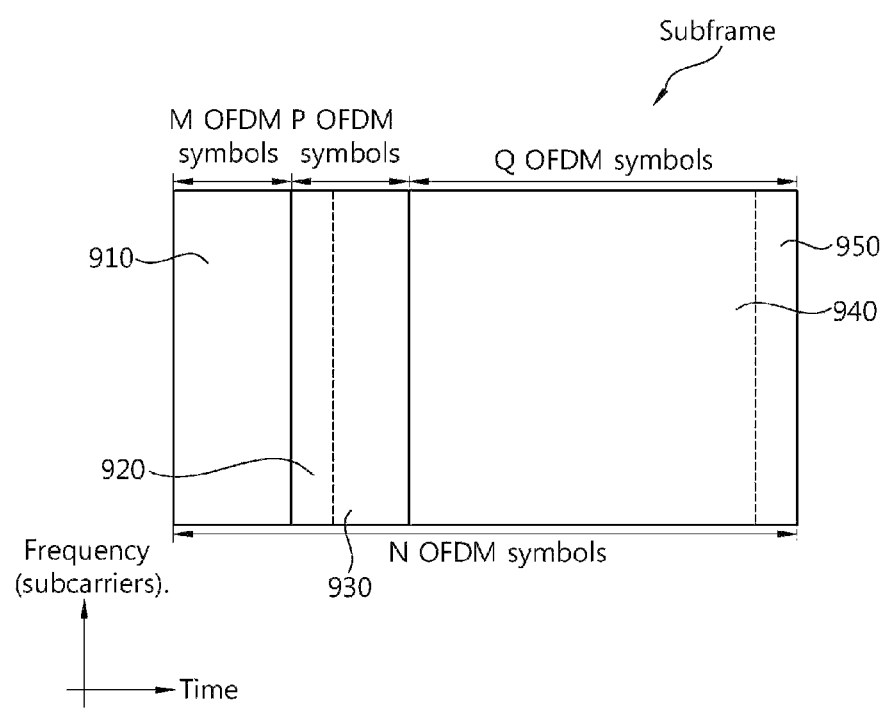
FIG. 9 shows an example of a radio resource allocation method for a downlink subframe in which a BS transmits signals to a relay station.

FIG. 9 shows an example of a radio resource allocation method for a downlink subframe in which a BS transmits signals to a relay station. That is, the following downlink subframe relates to a radio resource allocation method on a subframe in which a PDSCH is transmitted to one or more relay stations. Referring to FIG. 9, the subframe may include a first control zone 910, a second control zone 930, a data zone 940, and transition gaps 920 and 950 for switching stabilization.

The first control zone 910 may include an RS and a control channel according to the first RAT. For example, the first control zone 910 may include the RS and the control channel for LTE UEs. The control channel for LTE UEs may include at least one of, for example, a PHICH, a PCFICH, and a PDCCH not associated with a PDSCH included in the data zone 940. The PHICH for LTE UEs is to maintain the HARQ timing relationship synchronized on HARQ. In other words, the first control zone 910 guarantees backward compatibility with an LTE UE by supporting the LTE UEs in the measurement of a reference signal and the reception of control channels including a control signal.

The second control zone 930 may include an RS or a control channel or both according to the second RAT. For example, the second control zone 930 may include the RS or the control channel or both for a relay station. The control channel for relay stations may include at least one of a PHICH for the relay stations and a PDCCH associated with a PDSCH transmitted to the relay stations.

The RS for relay stations may be mapped to a specific frequency domain on specific one or more OFDM symbols in the second control zone 930 and the data zone 940 and then transmitted. The RS for relay stations may be used for the relay station for the measurement of the reference signal or for the demodulation of a reception signal or both.

A PDSCH for a relay station may be allocated to the data zone 940, and then data may be transmitted through the data zone 940.

The transition gaps 920 and 950 for switching stabilization are gaps for removing instability due to the ON/OFF of a power AMP when a relay station switches, such as that the relay station transmits a signal and then receives a signal or receives a signal and then transmits a signal. The first transition gap 920 is a gap in which a relay station is switched in order to transmit a PDCCH to its own relay UE in the first control zone 910 and then to receive a PDCCH from a BS in the second control zone 930. The second transition gap 950 is a gap in which a relay station is switched in order to receive a PDSCH from a BS in the data zone 940 and then to transmit a PDCCH to its own relay UE in the first control zone of a next subframe. The first transition gap 920 may be formed of at least one OFDM symbol or some of the OFDM symbol between the first control zone 910 and the second control zone 930. The second transition gap 950 may be formed of the last OFDM symbol of a subframe or some of the last OFDM symbol. The first transition gap 920 or the second transition gap 950 or both may not be additionally defined, if a relay station can secure a sufficient time to stably switch the ON/OFF of a power AMP from a transmission and reception point of view. For example, if the access downlink transmission of a relay station is terminated and the time to switch the ON/OFF of a power AMP is secured within the first control zone, the first transition gap 920 may not be defined. For another example, if an adequate time offset is assigned between the time when a relay station transmits an access downlink subframe and the time when the relay station receives a backhaul downlink subframe from a BS, the second transition gap 950 may not be defined.

A method of informing a relay station of a P value, indicating the number of OFDM symbols regarding the second control zone 930, and a method of determining a transport block size through a PDSCH transmitted to a relay station may use the method of informing a P value of an LTE-A UE and the method of determining a transport block size (TBS) through a PDSCH transmitted to an LTE-A UE, described above with reference to FIG. 7.

Furthermore, unlike in FIG. 9, the second control zone 930 does not need to be necessarily composed of consecutively contiguous OFDM symbols, but may be composed of separated OFDM symbols.

Figure 10:
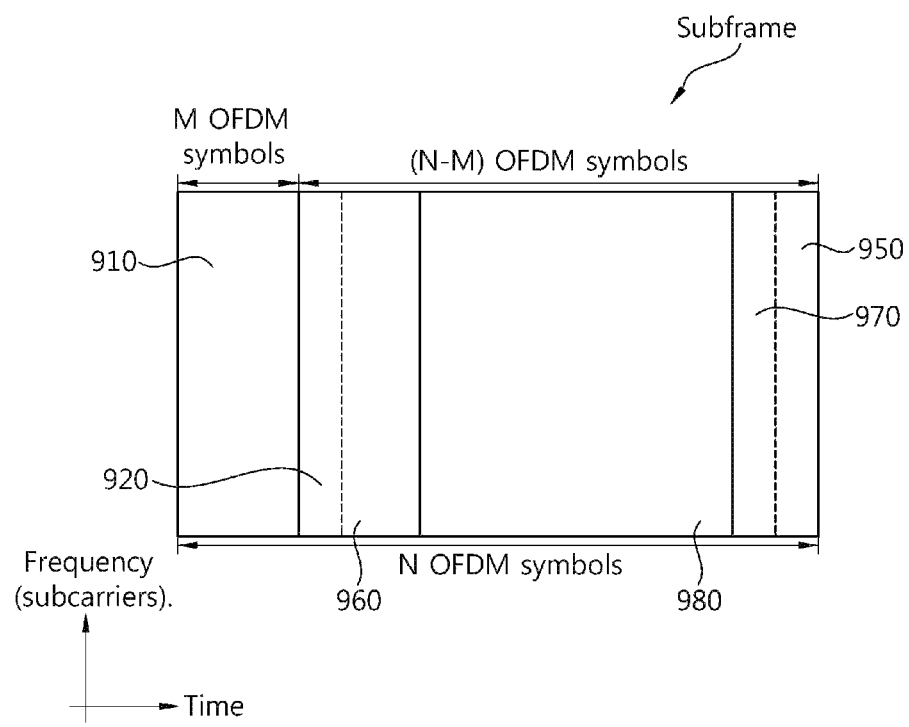
FIG. 10 shows an example in which a second control zone is separated.

FIG. 10 shows an example in which the second control zone is separated.

As shown in FIG. 10, the second control zone may be defined as a first subzone 960 and a second subzone 970. The first subzone 960 may be placed in the former part (i.e., a first slot) of a subframe, and the second subzone 970 may be placed in the latter part (i.e., a second slot) of the subframe. Here, the first subzone 960 is illustrated to be subsequent to a first transition gap 920, and the second subzone 970 is contiguous to a second transition gap 950. A data zone 980 may exist between the first subzone 960 and the second subzone 970.

The second control zone may be separated into a plurality of subzones according to the characteristic of a BS that transmits a signal to a relay station. In other words, a physical signal and control information transmitted through the second control zone may be transmitted through the subzones 960 and 970, separated from each other, according to their attributes. For example, a PDCCH transmitted to a relay station may be transmitted through the first subzone 960 including a specific number of first OFDM symbols, and a PHICH transmitted to the relay station may be transmitted through the second subzone 970 including a specific number of latter OFDM symbols. In this case, an RS for relay stations may be defined in a specific pattern in the second control zones 960 and 970 and the data zone 980. Furthermore, the transition gaps 920 and 950 for switching stabilization may be set as a zone, including a specific number of former and latter OFDM symbols in the (N–M) OFDM symbol section, or some of the OFDM symbols, irrespective of multiplexing on the OFDM symbols of the second control zones 960 and 970 and the data zone 980. The first transition gap 920 or the second transition gap 950 or both may not be additionally defined, if a relay station can secure a sufficient time to stably switch the ON/OFF of a power AMP from a transmission and reception point of view.

Figure 11:
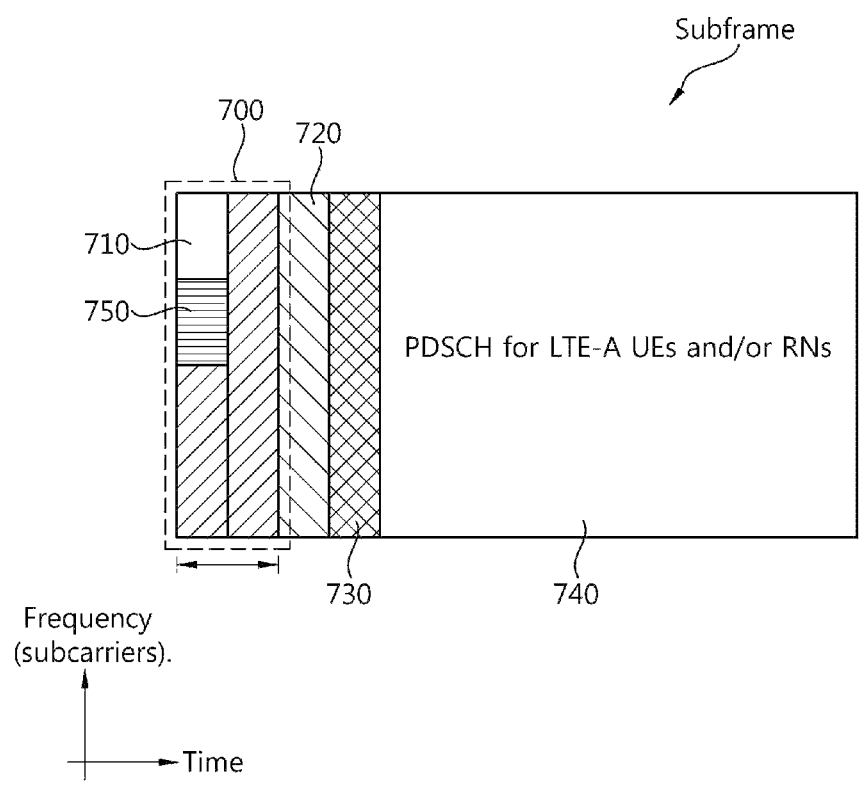
FIG. 11 shows an example in which an additional PDCCH and a new PCFICH for LTE-A User Equipments (UEs) or relay stations or both are allocated.

FIG. 11 shows an example in which an additional PDCCH and a new PCFICH for an LTE-A UE or a relay station or both are allocated.

A subframe includes N OFDM symbols in the time domain and includes a plurality of subcarriers in the frequency domain. The subframe is classified into three zones, including a first control zone 700, a second control zone 720 or 730, and a data zone 740 in the time domain. The three zones have been subjected to TDM (Time Division Multiplexing). The first control zone 700 may include one or two OFDM symbols. FIG. 11 shows that the first control zone 700 includes two OFDM symbols. The second control zone 720 or 730 includes a specific number (e.g., one OFDM symbol) subsequent to the first control zone, and the data zone 740 includes the remaining OFDM symbols from among the N OFDM symbols.

The first control zone 710 may include a control channel or an RS or both for LTE UEs and further include an additional control channel for LTE-A UEs. The control channel or an RS or both for LTE UEs may be control information or an RS or both which are included in the control zone of an MBSFN subframe. The additional control channel for LTE-A UEs may be, for example, a PCFICH (hereinafter referred to as a new PCFICH).

The new PCFICH is only for LTE-A UEs and may be CRC masking to a cell-common RNTI (e.g., PCFICH-RNTI) and transmitted so that all LTE-A UEs within a cell can perform blind decoding. In this case, the cell-common RNTI may be broadcasted through an LTE-A-specific BCCH (Broadcast Control Channel) in order to inform only the LTE-A UEs of the cell-common RNTI, but not to inform LTE UEs of the cell-common RNTI. In an alternative, the cell-common RNTI may be unicasted to all LTE-A UEs through an upper layer signal, such as RRC. For example, the cell-common RNTI, together with the C-RNTI, may be allocated in a process of LTE-A UEs entering a cell.

A zone 750 to which the new PCFICH is allocated may be fixed to a specific zone in order to reduce a blind decoding load on LTE-A UEs. FIG. 11 shows that the zone 750 to which the new PCFICH is allocated is the same OFDM symbol section as the zone 710 to which a PCFICH for LTE UEs is allocated in the time domain and is a zone adjacent to the zone 710 to which a PCFICH for LTE UEs is allocated in the frequency domain, within the first control zone 700. However, the present invention is not limited thereto, and the zone 750 to which the new PCFICH is allocated to may be various positions within the first control zone 700. For example, the zone 750 to which the new PCFICH is allocated to may be the last OFDM symbol section in the time domain in the first control zone 700 and may be a zone, including a subcarrier having the highest or lowest frequency in the frequency domain.

The new PCFICH may include the following information.

1) LTE-A-dedicated subframe information: Information to inform whether a configured MBSFN subframe is an MBSFN subframe for MBMS data transmission (called a substantial MBSFN subframe) or an MBSFN subframe allocated for the use of an LTE-A-dedicated subframe for supporting the feature of LTE-A (called a fake MBSFN subframe).

2) The total size of added PDCCHs in a subframe: Information to inform the number of OFDM symbols added to the second control zone 720 or 730 of the subframe (i.e., a control zone to which a PDCCH for LTE-A UEs and relay stations is allocated.

3) The number of OFDM symbols to which LTE-A UEs have to attempt blind decoding: Information to inform the number of OFDM symbols that LTE-A UEs have to substantially perform blind decoding in order to reduce a blind decoding load on the LTE-A UEs. For example, in FIG. 11, in the case where scheduling and a PHICH for LTE-A UEs are transmitted through the first 3 OFDM symbols of the subframe and scheduling and a PHICH for relay stations are transmitted through the fourth OFDM symbol, the LTE-A UEs may be informed of 3.

From among the pieces of information included in the new PCFICH, the LTE-A-dedicated subframe information may not be transmitted through the new PCFICH, but LTE-A-dedicated subframe pattern information may be separately broadcasted through an LTE-A-specific BCH or each of LTE-A UEs or relay stations may be informed of the LTE-A-dedicated subframe information through an upper layer signal in the form of RRC control information. Here, only in relation to a subframe allocated as an MBSFN subframe as some of system information, whether the corresponding subframe is being used as an LTE-A-dedicated subframe may be additionally informed. When the LTE-A-dedicated subframe pattern is allocated, a bitmap may be set for each subframe as part of system information and a subframe pattern may be informed. The new PCFICH may comply with the PDCCH format of LTE.

The second control zone 720 or 730 may include a control channel (e.g., PDCCH) for LTE-A UEs or relay stations or both. From the standpoint of the relay station, the relay station transmits control information to a relay UE in the first control zone 700 and then receives the PDCCH from a BS in the second control zone 720 or 730 (communication with the BS in the backhaul link). In the case where the relay station transmits the control information to the relay UE using one OFDM symbol, the relay station can receive the PDCCH from a third OFDM symbol. In this case, the second control zone 720 includes the third OFDM symbol. On the other hand, in the case where the relay station transmits the control information to the relay UE using two OFDM symbols, the relay station can receive the PDCCH from a fourth OFDM symbol. In this case, the second control zone 730 includes the fourth OFDM symbol.

The data zone 740 may include a data channel (i.e., PDCCH) for LTE-A UEs or relay stations or both.

Figure 12:
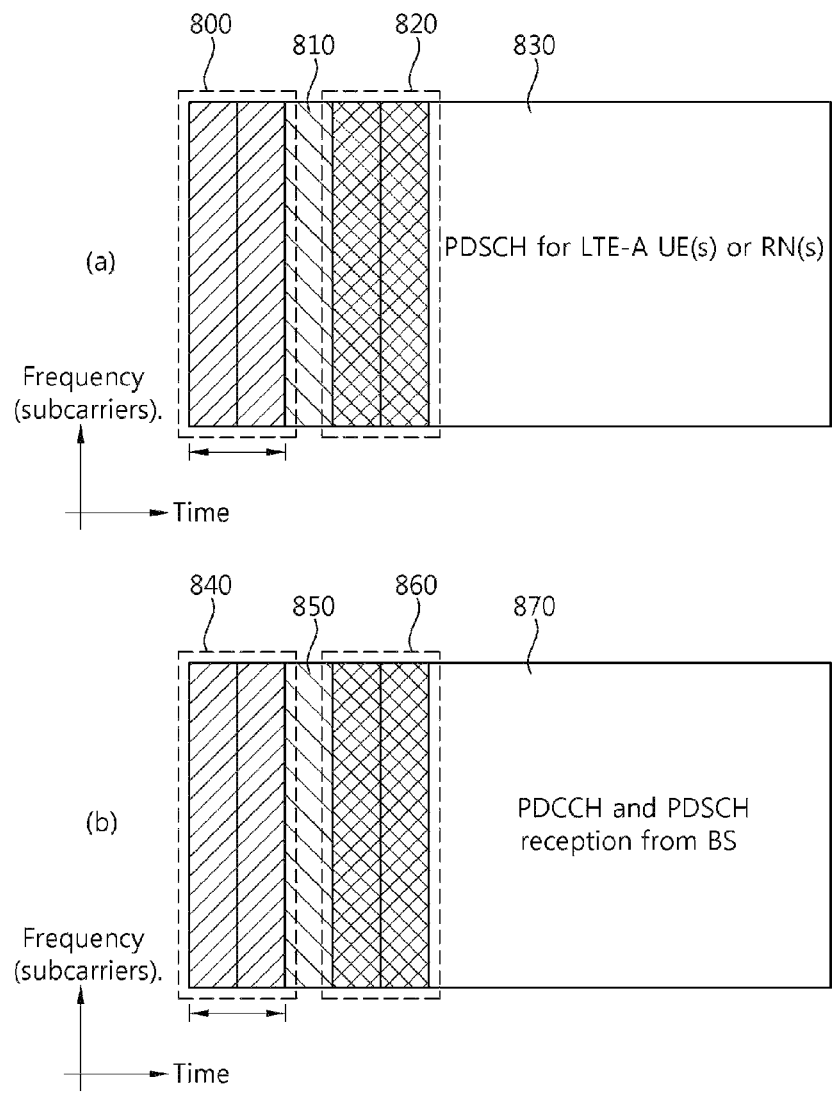
FIG. 12($a$) shows a subframe structure from the standpoint of a BS when a relay station receives signals from the BS.

FIG. 12(a) shows a subframe structure from the standpoint of a BS when a relay station receives signals from the BS, and FIG. 12(b) shows a subframe structure from the standpoint of a relay station when the relay station receives signals from a BS.

Referring to FIGS. 12(a) and 12(b), for backward compatibility purposes, the number of OFDM symbols that a BS allocates a control channel and a reference signal to an LTE UE (i.e., a macro UE) is the same as the number of OFDM symbols that a relay station allocates a control channel and a reference signal to an LTE UE (i.e., a relay UE) (FIGS. 12(a) and 12(b) illustrate that the number of OFDM symbols is 2, but may be 1).

A relay station must transmit a control channel and a reference signal through a zone 840, including the first 2 OFDM symbols of a subframe, to a relay UE and then leave a transition gap 850 for switching stabilization (1 OFDM symbols). The relay station can receive a PDCCH from a BS in a zone 860, including fourth and fifth OFDM symbols, and then receive data from the BS through the data zone 870 of the subframe.

A BS can transmit a control channel and a reference signal to LTE UEs through a zone 800, including the first 2 OFDM symbols of the subframe, and then transmit a PDCCH to the LTE-A UEs in a zone 810 corresponding to the transition gap 850 for the switching stabilization of relay stations. The BS utilizes the zone 810, corresponding to the transition gap 850 for the switching stabilization of relay stations, in order to prevent the waste of radio resources. Furthermore, the BS transmits a PDCCH to the LTE-A UEs or the relay stations or both in a zone 820, including fourth and fifth OFDM symbols, and then transmits data to the LTE-A UEs or the relay stations or both through the data zone 830 of the subframe.

Figure 13:
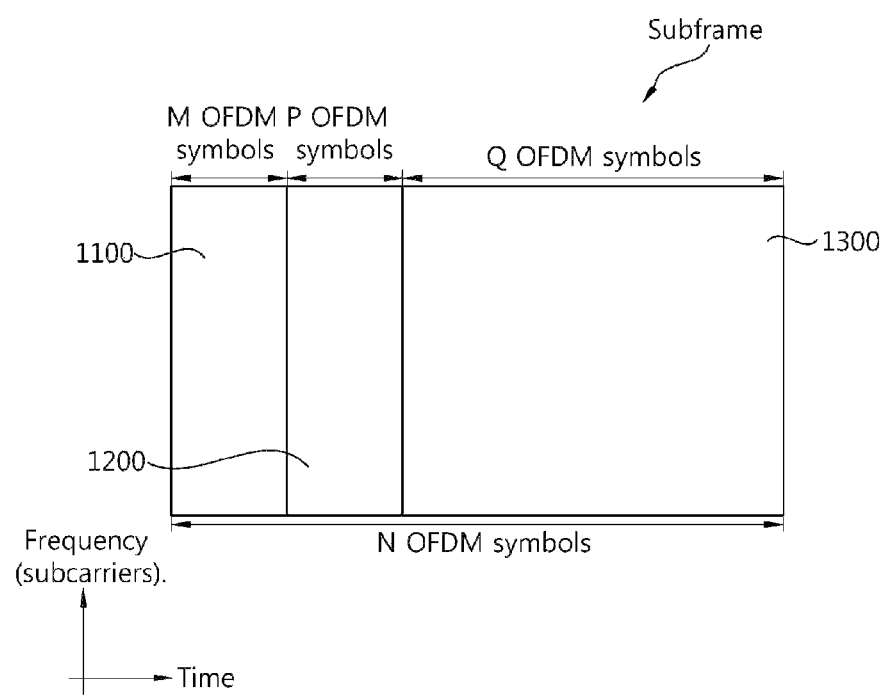
FIG. 13 shows a radio resource allocation method for a subframe according to another embodiment of the present invention.

FIG. 13 shows a radio resource allocation method for a subframe according to another embodiment of the present invention. The subframe includes N OFDM symbols in the time domain and includes a plurality of subcarriers in the frequency domain. The subframe includes three zones, including a first control zone 1100, a second control zone 1200, and a data zone 1300 in the time domain. The three zones have been subjected to TDM (Time Division Multiplexing). The first control zone includes first M OFDM symbols from among the N OFDM symbols, the second control zone includes P OFDM symbols subsequent to the first control zone, and the data zone includes the remaining Q (Q=N−M−P) OFDM symbols. M or P may have any one value of 1, 2, and 3. The number of OFDM symbols included in each of the three zones is not limited and may be fixed or varied according to a system. Furthermore, the position or sequence of the three zones is only illustrative and may be changed.

The first control zone 1100 may include a control channel for LTE UEs and LTE-A UEs and an RS for LTE UEs. The control channel for LTE UEs may include at least one of a PHICH, a PCFICH, and a PDCCH not associated with a PDSCH included in the data zone 1300. The control channel for LTE-A UEs may include at least one of a PHICH, a PCFICH, and a PDCCH. For the demodulation/decoding of the control channel for LTE-A UEs, the RS for LTE UEs defined in the first control zone 1100 may be received and then channel estimation may be performed or the RS for LTE-A UEs defined in the second control zone 1200 or the data zone 1300 or both may be received and then channel estimation may be performed.

The PDCCH for LTE-A UEs may include 1) at least one of a PDCCH related to the setting of a resource allocation and transmission method for the reception of the PDSCH, included in the data zone 1300 applied to an LTE-A-specific feature, or a resource allocation and transmission method for a PUSCH transmitted by the LTE-A UEs, 2) a PDCCH related to UE-specific or cell-specific L1/L2 control signaling control information, such as an MCS, and 3) a PDCCH for a paging signal, a random access response, and system information which are received by some or all of UEs. The PDCCH for LTE-A UEs included in the first control zone 1100 may be multiplexed with the PDCCH for LTE UEs and may be transmitted.

The second control zone 1200 may include a PHICH for uplink transmission of LTE-A UEs. In this case, the fact that the PHICH for LTE-A UEs has the same physical channel format as the LTE PHICH may be basically taken into consideration. In contrast, in the case where the PHICH for LTE-A UEs includes the physical channel format of a series of PDCCHs, the DCI format of the PDCCH may use a new DCI format different from that of LTE or may use the existing DCI format (method 1).

Unlike the above example, in the first control zone 1100, the PHICH for uplink transmission of LTE-A UEs may be multiplexed with the PHICH for LTE UEs and transmitted, and the PDCCH for LTE-A UEs may be transmitted through the second control zone 1200 (method 2).

The above two examples are summarized in Table 3.

TABLE 3

|  | ZONE 1 | ZONE 2 | ZONE 3 |
|---|---|---|---|
| METHOD 1 | LTE PDCCH LTE-A PDCCH LTE RS | LTE-A PHICH | LTE-A PDSCH |
| METHOD 2 | LTE PHICH LTE-A PHICH LTE RS | LTE-A PDCCH | LTE-A PDSCH |

Unlike the above examples, the control channel for LTE-A UEs (e.g., a UE-specific or cell-specific PDCCH defined for LTE-A UEs) may be separated in the first control zone 1100 and the second control zone 1200 and transmitted.

For example, a PDCCH using the DCI format of LTE, from among the PDCCHs for LTE-A UEs, may be transmitted in the first control zone 1100, and a PDCCH having a new DCI format defined for LTE-A and requiring a changed transmission method may be transmitted in the second control zone 1200.

For another example, a UE-specific PDCCH for PDSCH decoding or PUSCH coding of LTE-A UEs may be transmitted through the second control zone 1200, and a cell-specific PDCCH for other pieces of control information may be transmitted through the first control zone 1100. In the above two examples, the first control zone and the second control zone may be turned and allocated and the PDCCH for LTE-A UEs may be transmitted. Furthermore, in the above two examples, the PHICH for LTE-A UEs may be transmitted through the first control zone or the second control zone.

The second control zone 1200 may be separated according to the feature of LTE-A. For example, the second control zone 1200 may be transmitted through zones which are separated from each other according to the attributes of a physical signal and control information transmitted through the second control zone. In this case, the second control zone 1200 may be defined using separated OFDM symbols. The case where the second control zone is separated has been described above with reference to FIG. 10. The same method as described with reference to FIG. 10 may be used.

An RS and a data channel for LTE-A UEs may be allocated to the data zone 1300. Data, having the format on the subframe materialized according to the new characteristic of LTE-A, is transmitted through the data channel (i.e., a PDSCH) for LTE-A UEs. The RS for LTE-A UEs supports the demodulation/decoding and measurement of the LTE-A UEs for the transmission of the data channel, and the RS for LTE-A UEs may be mapped to radio resources according to a different pattern from the RS for LTE UEs on the basis of the new characteristic of LTE-A. The pattern of the RS for LTE-A UEs may be defined in the data zone and may be defined in the second control zone and the data zone. The RS for LTE-A UEs may be mapped to a specific frequency domain on specific one or more OFDM symbols in the second control zone and the data zone and then transmitted.

A P value, indicating the number of OFDM symbols related to physical signal transmission in the second control zone 1200 (i.e., the physical signal transmission of a control channel, such as a PDCCH or a PHICH, and a reference signal), may be static. The P value may have any one value of 1, 2, and 3. In an alternative, the P value may be transmitted to an LTE-A UE through an upper layer signal, such as an RRC (Radio Resource Control) signal, or a BCCH (Broadcast Control Channel), for each cell or system. In another alternative, the P value may be transmitted to an LTE-A UE using the designated resources of the second control zone 1200 through the same channel (an independent L1 control channel) as a PCFICH of LTE. In yet another alternative, like the PDCCH for LTE UEs using CCEs in the first control zone 1100, the P value may define a channel to inform the number of OFDM symbols of the second control zone 1200. In this case, both a method of identifying the P value using one designated RNTI and a method of using a separate dedicated indication channel may be used. The method of identifying the P value using one designated RNTI may be transmitted by mapping the P value to a common search space. Here, the designated RNTI becomes a common RNTI.

Data, having the format on the subframe materialized according to the new characteristic of LTE-A, is transmitted through the data channel (i.e., PDSCH) for LTE-A UEs. A Transport Block Size (TBS) transmitted through the PDSCH for LTE-A UEs is the same as that of a downlink subframe used in LTE, but may be defined using a method of matching the transport block size with the number of modulation symbols of the corresponding subframe through a rate matching process. In an alternative, the transport block size transmitted in the PDSCH for LTE-A UEs may have a different value from that of a downlink subframe used in LTE. In this case, the transport block size may be designated according to the MCS (Modulation Coding Scheme) and the number of allocated PRBs (physical resource blocks).

The radio resource allocation method for a subframe described with reference to FIG. 13 according to another embodiment of the present invention may be applied to LTE-A in which a PDSCH is transmitted using an extended number of transmission antennas than the number of transmission antennas of LTE, thus providing backward compatibility.

Figure 14:
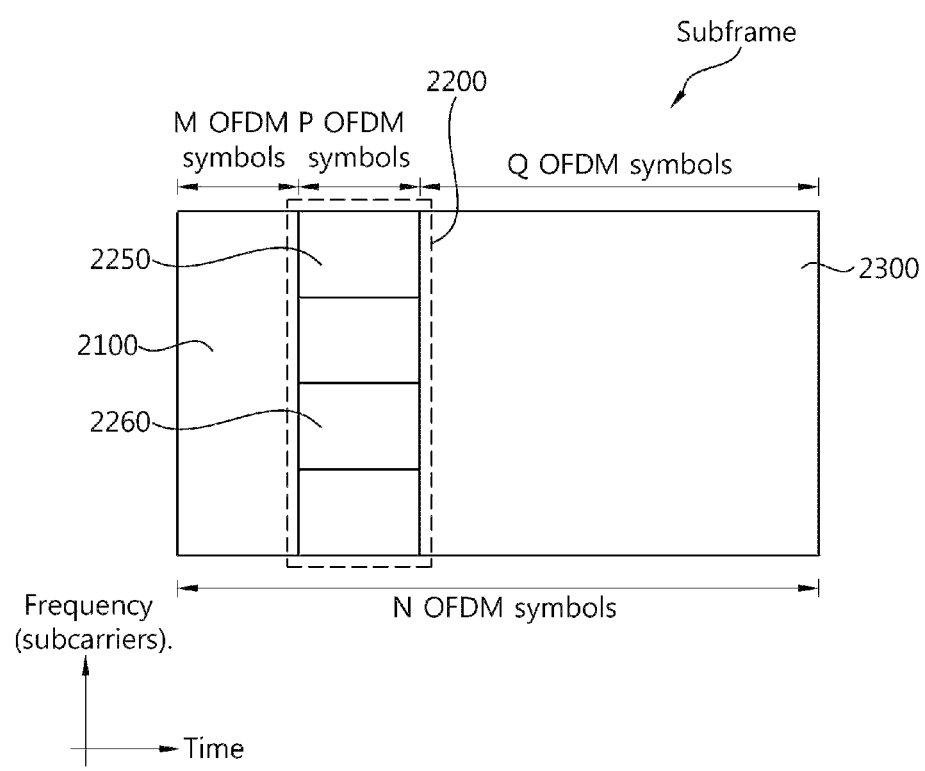
FIG. 14 shows an example of radio resource allocation for a subframe according to yet another embodiment of the present invention.

FIG. 14 shows an example of radio resource allocation for a subframe according to yet another embodiment of the present invention.

Referring to FIG. 14, a subframe includes N OFDM symbols in the time domain and includes a plurality of subcarriers in the frequency domain. The subframe may be classified into three zones, including a first control zone 2100, a second control zone 2200, and a data zone 2300 in the time domain. The three zones have been subjected to TDM (Time Division Multiplexing), and the second control zone may have been subjected to FDM (Frequency Division Multiplexing). The first control zone 2100 includes first M OFDM symbols from among the N OFDM symbols, the second control zone 2200 includes P OFDM symbols subsequent to the first control zone, and the data zone 2300 includes the remaining Q(Q=N−M−P) OFDM symbols. M or P may have any one value of 1, 2, and 3. The number of OFDM symbols included in each of the three zones is not limited and may be fixed or varied according to a system. Furthermore, the position or sequence of the three zones is only illustrative and may be changed.

An RS and a control channel according to the first RAT may be allocated to the first control zone 2100. For example, the control channel and the RS for LTE UEs may be allocated to the first control zone 2100. The control channel for LTE UEs may include at least any one of a PHICH, a PCFICH, and a PDCCH not associated with a PDSCH included in the data zone 2300.

Furthermore, a control channel according to the second RAT may be allocated to the first control zone 2100. For example, the control channel for LTE-A UEs may be allocated to the first control zone 2100. The control channel for LTE-A UEs may include a PHICH and a PDCCH.

The PDCCH for LTE-A UEs may include at least one of 1) a PDCCH related to the setting of a resource allocation and transmission method for the reception of a PDSCH or the transmission of a PUSCH for LTE-A UEs, included in the data zone 2300 to which an LTE-A-specific characteristic is applied, 2) a PDCCH related to UE-specific or cell-specific L1/L2 control signaling control information, such as an MCS, or related to more pieces of control information than frequency allocation information about the reception of a PDSCH included in the data zone, and 3) a PDCCH for other pieces of control information, such as a paging signal, a random access response, and system information which are received by some or all of UEs. The PDCCH and PHICH for LTE-A UEs, included in the first control zone 1100, may be multiplexed with the PDCCH for LTE UEs and transmitted. Furthermore, the PDCCH for LTE-A UEs, included in the first control zone 1100, may use the DCI format of the existing LTE or may use a new DCI format as occasion demands.

The second control zone 2200 may include a control channel and RS for LTE-A UEs. The control channel for LTE-A UEs may include at least one of a PDCCH, a PCFICH, and a PHICH.

The second control zone 2200 includes radio resource zones 2250 and 2260 allocated for each LTE-A UE through the PDCCH for LTE-A UEs included in the first control zone 2100. Pieces of additional control information are transmitted in order to decode a PDSCH and obtain LTE-A system information for each LTE-A UE through the radio resource zones 2250 and 2260. The pieces of control information are transmitted as the PDCCH for LTE-A UEs. In this case, the existing DCI format may be used and a new DCI format may be defined as used. Furthermore, the RS for LTE-A UEs may be transmitted through the second control zone 2200. The RS for LTE-A UEs may support the measurement and demodulation of LTE-A UEs. Physical radio resource allocation of the PDCCH in the second control zone 2200 may be mapped using a different method from that of LTE, and the same method as that of LTE may be used in the entire bandwidth of a system.

In an alternative, the physical control channels transmitting control information in the second control zone 2200 may be subjected to FDM and transmitted. In this case, the control information may be specific control information about an LTE-A system and/or UE-specific or cell-specific supplementary information for the PDSCH decoding or the acquisition of other pieces of information for LTE-A UEs or both. Furthermore, FDM may be associated with the radio resource allocation of LTE-A UEs, may be independently and previously set, or may be performed using a specific rule. The frequency resources of the second control zone through which FDM control channels have not been transmitted may be used to transmit the data channel for one or more LTE-A UEs according to circumstances. The PDCCH for the PDSCH decoding and demodulation of LTE-A UEs may be basically transmitted through the first control zone 2100.

The PHICH for uplink transmission of LTE-A UEs may be transmitted through the first control zone 2100 and may be multiplexed according to the FDM or CDM scheme based on uplink transmission information through the second control zone 2200 in order to deal with specific circumstances and then transmitted. PHICH transmission for uplink transmission of LTE-A UEs may be performed using any one of the various methods described with reference to FIG. 14.

An RS and a data channel for LTE-A UEs may be allocated to the data zone 2300. The RS for LTE-A UEs supports the demodulation/decoding and measurement of LTE-A UEs for data channel transmission. The RS for LTE-A UEs is materialized based on the new characteristic of LTE-A and may be mapped to specific radio resources. The RS for LTE-A UEs is mapped to a specific frequency domain on specific one or more OFDM symbols in the second control zone 2200 and the data zone 2300 and then transmitted.

Data, having the format on the subframe materialized according to the new characteristic of LTE-A, is transmitted through the data channel (i.e., PDSCH) for LTE-A UEs. A Transport Block Size (TBS) transmitted through the PDSCH for LTE-A UEs is the same as that of a downlink subframe used in LTE, but may be defined using a method of matching the transport block size with the number of modulation symbols of the corresponding subframe through a rate matching process. In an alternative, the transport block size transmitted in the PDSCH for LTE-A UEs may have a different value from that of a downlink subframe used in LTE. In this case, the transport block size may be designated according to the MCS (Modulation Coding Scheme) and the number of allocated PRBs (physical resource blocks).

A P value, indicating the number of OFDM symbols in the second control zone 2200, is static, and it may have any one value of 1, 2, and 3. The P value may be transmitted to an LTE-A UE through an upper layer signal, such as an RRC (Radio Resource Control) signal, or a BCCH (Broadcast Control Channel), for each cell or system. In another alternative, the P value may be transmitted to an LTE-A UE using the designated resources of the second control zone 2200 through the same channel (i.e., an independent L1 control channel) as the PCFICH of LTE. In yet another alternative, like the PDCCH for LTE UEs using CCEs in the first control zone 2100, the P value may define a channel to inform the number of OFDM symbols in the second control zone 2200. If the radio resource zone of the second control zone 2200 is allocated to each LTE-A UE through the PDCCH of the first control zone 2100 and the PDCCH or the reference signal or both for each control information of the second control zone 2200 is transmitted through the allocated radio resource zone, the number P of OFDM symbols of the second control zone 2200 may be differently set for each radio resource zone allocated to the LTE-A UE (i.e., any one value of 0, 1, 2, and 3). Here, the P value may be informed through an upper layer signal for each LTE-A UE or the PDCCH of the first control zone 2100 transmitted to each LTE-A UEs.

The position of the second control zone 2200 may be differently defined as in FIG. 14. For example, in the (N−M) OFDM symbol section, the position of the second control zone 2200 may be defined as zones separated from each other according to the attributes of a physical signal and control information. That is, the second control zone 2200 needs not to be necessarily contiguous to the first control zone 2100, and the second control zone 2200 needs not to be necessarily composed of contiguous OFDM symbols. Furthermore, in the above description given with reference to FIG. 14, the P value indicating the number of OFDM symbols in the second control zone 2200 is illustrated to be a maximum of 3, but not limited thereto. The P value may have an (N−M) value. In the case of P=(N−M), the range of radio resource allocation for the frequency domain of the second control zone 2200 may be limited to a specific frequency band which is designated in the UE-specific or cell-specific PDCCH of the first control zone 2100. Furthermore, the position of the second control zone 2200 within the allocated radio resource zone may be defined by a specific rule or agreement between a BS and an LTE-A UE.

The radio resource allocation method for a subframe described with reference to FIG. 14 may be used in the case where a wireless communication system includes relay stations or in the case where a more extended number of transmission antennas than that of LTE are used, thus providing backward compatibility.

Figure 15:
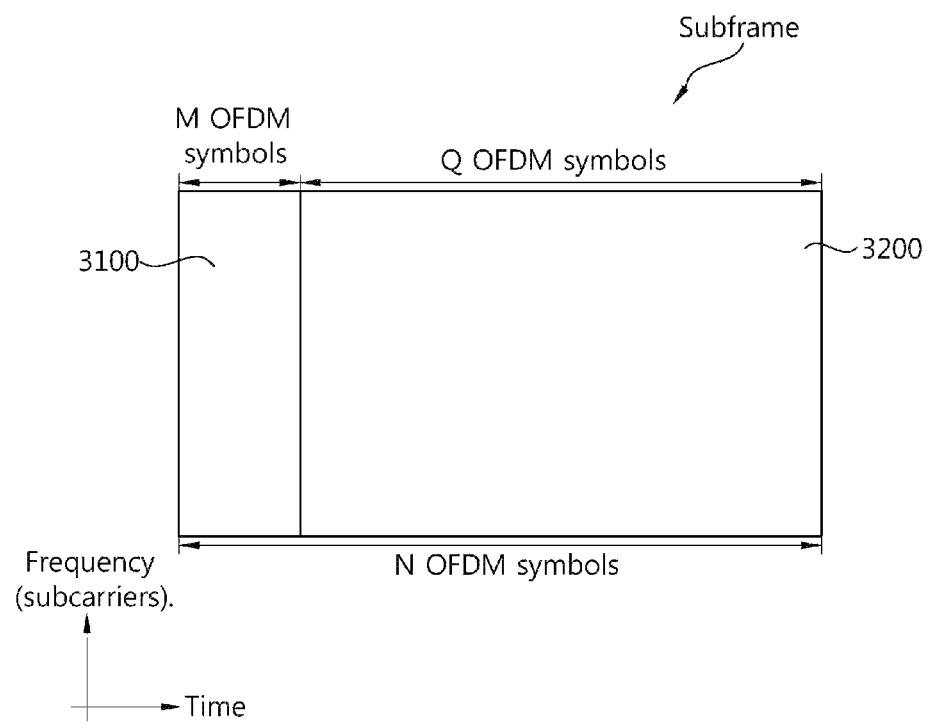
FIG. 15 shows a radio resource allocation method for a subframe according to further yet another embodiment of the present invention.

FIG. 15 shows a radio resource allocation method for a subframe according to further yet another embodiment of the present invention.

Referring to FIG. 15, the subframe includes N OFDM symbols in the time domain and a plurality of subcarriers in the frequency domain. The subframe is classified into two zones, including a first control zone 3100 and a data zone 3200 in the time domain. The two zones have been subjected to TDM (Time Division Multiplexing). The first control zone 3100 includes first M OFDM symbols, from among the N OFDM symbols, and the data zone 3200 includes the remaining Q(Q=N−M) OFDM symbols. M may have any one value of 1, 2, 3, and 4.

An RS or a control channel or both according to the first RAT or the second RAT or both may be allocated to the first control zone 3100. For example, the RS or the control channel (i.e., at least any one of a PHICH, a PCFICH, and a PDCCH not associated with the PDSCH of the data zone 3200) or both for the decoding of physical channels using LTE UEs or an LTE transmission method may be allocated to the first control zone 3100.

Furthermore, the first control zone 3100 may include the control channel (i.e., at least any one of a PHICH and a PDCCH associated with a PDSCH) for LTE-A UEs. The PDCCH for LTE-A UEs may include UE- or cell-common control information for receiving a PDSCH included in the data zone 3200. The PDCCH for LTE-A UEs may use the same DCI format of the existing LTE or may use a newly defined DCI format. The reception decoding of the PDCCH for LTE-A UEs may be performed on the basis of channel estimation through the RS defined in the same control zone.

An RS, a data channel, and/or a control channel for LTE-A UEs may be allocated to the data zone 3200. The RS for LTE-A UE supports the demodulation/decoding and channel measurement of the LTE-A UEs for data channel transmission. The RS for LTE-A UE may be materialized on the basis of the new characteristic of LTE-A and mapped to specific radio resources. The RS for LTE-A UEs may be mapped to specific frequency domain on specific one or more OFDM symbols in the data zone 3200 and then transmitted.

Data, having the format on the subframe materialized according to the new characteristic of LTE-A, is transmitted through the data channel (i.e., PDSCH) for LTE-A UEs. Furthermore, the PHICH for uplink transmission of LTE-A UEs and some specific pieces of control information, from among the pieces of control information transmitted on the entire subframe, may be transmitted through the data zone 3200 along with the PDSCH for LTE-A UEs. That is, some of the PHICH and the control channel may be transmitted through the PDSCH for LTE-A UEs by using a puncturing or insertion method (accompanied by rate matching on the PDSCH.

The radio resource allocation method for a subframe described with reference to FIG. 15 may be used in the case where a wireless communication system includes relay stations, in the case where a more extended number of transmission antenna than that of LTE are used, or PDSCH transmission based on a plurality of antenna transmission schemes newly introduced, thus providing backward compatibility.

Hereinafter, an HARQ operation for providing backward compatibility with LTE is described.

Figure 16:
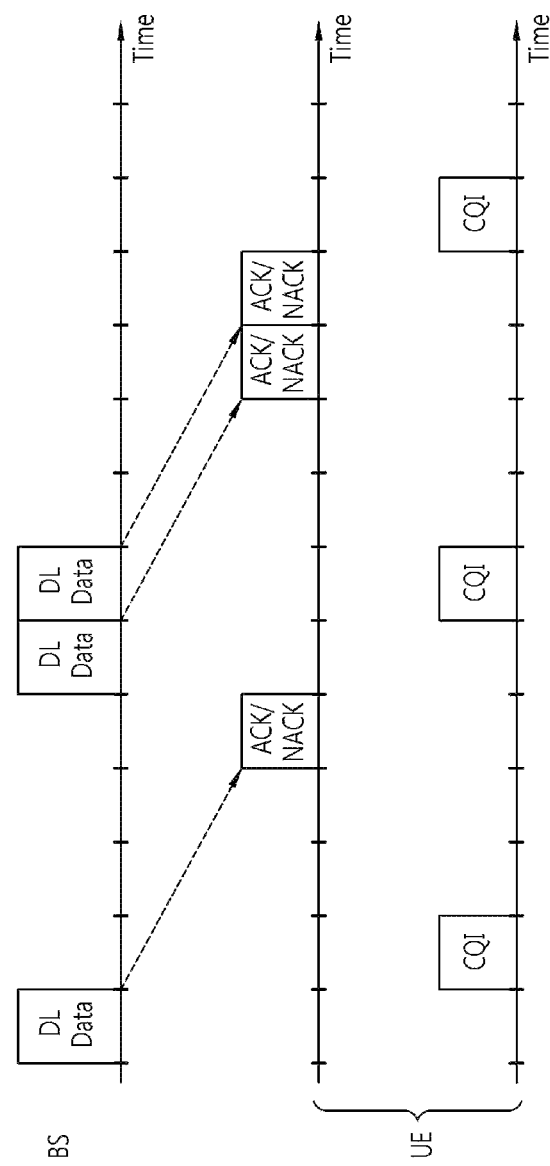
FIG. 16 shows the transmission of an HARQ ACK/NACK signal and a CQI in LTE.

FIG. 16 shows the transmission of an HARQ ACK/NACK signal and a CQI in LTE.

Referring to FIG. 16, a UE that has received downlink data from a BS transmits an HARQ ACK (Acknowledgement)/NACK (Not-Acknowledgement) signal after a lapse of a certain time. The downlink data may be transmitted through a PDSCH (Physical Downlink Shared Channel) indicated by a PDCCH (Physical Downlink Control Channel). The HARQ ACK/NACK signal becomes an ACK signal when the downlink data is successfully decoded, and the HARQ ACK/NACK signal becomes an NACK signal when the decoding of the downlink data is failed. When an NACK signal is received, the BS may retransmit the downlink data until an ACK signal is received or up to a maximum number of retransmissions.

The BS may dynamically inform the time when the HARQ ACK/NACK signal is transmitted and resource allocation for the downlink data through signaling. In an alternative, the time when the HARQ ACK/NACK signal is transmitted and resource allocation for the downlink data may be previously agreed according to the time when the downlink data is transmitted or resource allocation. For example, when a PDSCH is received through an $n^{th}$ subframe in an FDD (Frequency Division Duplex) system, the HARQ ACK/NACK signal for the PDSCH may be transmitted through a PUCCH (Physical Uplink Control Channel) within an $(n+4)^{th}$ subframe. The UE may measure a downlink channel state and report a CQI to the BS periodically or aperiodically or both. The BS may use the CQI for downlink scheduling. The BS may inform the UE of information about the time when the CQI is transmitted or about resource allocation.

An LTE-A system may include relay stations. In the case where a BS transmits signals to the relay stations, there may be a problem in that LTE UEs cannot receive an RS in a relevant subframe. In order to provide backward compatibility with LTE UEs, a subframe used in an LTE-A system is called a fake subframe, for convenience sake. The fake subframe may be, for example, a fake MBSFN subframe and a blank subframe (but not limited thereto, and the fake subframe includes all subframes used in the LTE-A system in order to provide backward compatibility with LTE UEs). In the case where the fake MBSFN subframe transmits an RS for an LTE UE through a specific number of first OFDM symbols included in the control zone of a subframe and the LTE UE receives the RS included in the subframe, the fake MBSFN subframe refers to a subframe through which data is not received through OFDM symbols after OFDM symbols including the RS within the subframe. The BS may transmit control information and data to relay stations by using OFDM symbols within the fake MBSFN subframe. The blank subframe refers to a subframe from which the LTE UE does not expect the reception of an RS in a subframe.

In LTE-A, the allocation cycle of the fake subframe may be set in the unit of eight subframes (8 ms) in order to make the allocation cycle identical to the HARQ cycle of LTE-A. A case where the allocation cycle of the fake subframe is set to 8 ms and the fake subframe is allocated to a 10 ms radio frame is taken into consideration.

Figure 17:
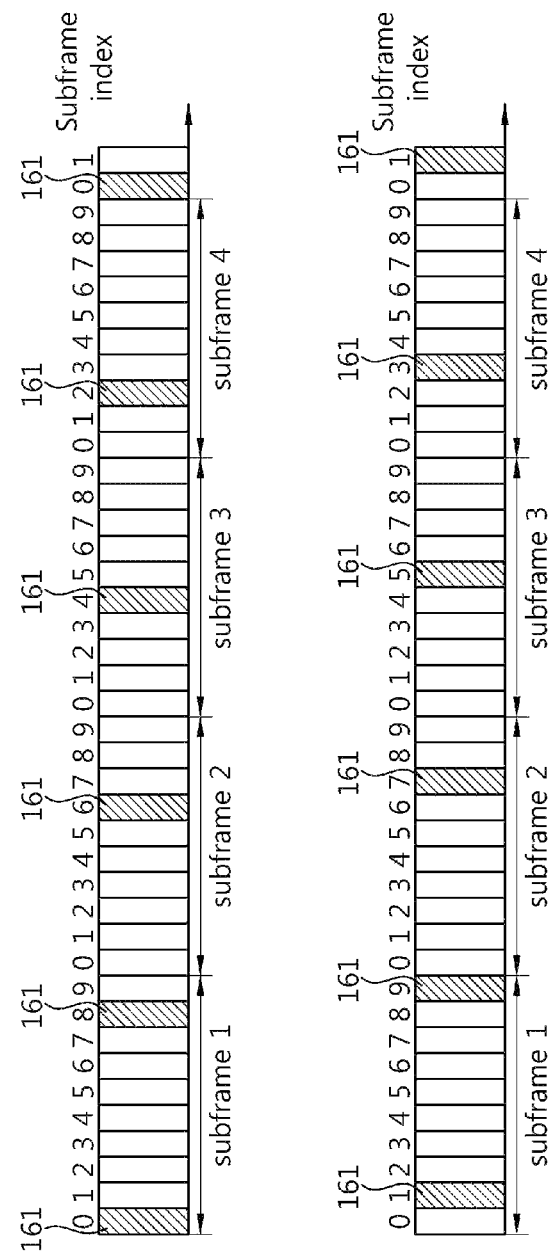
FIG. 17 is a diagram showing a case where a fake subframe is allocated to a 10 ms radio frame when the allocation cycle of the fake subframe is 8 ms.

FIG. 17 is a diagram showing a case where the fake subframe is allocated to a 10 ms radio frame when the allocation cycle of the fake subframe is 8 ms. Referring to FIG. 17, the allocation pattern of the fake subframe 161 is periodically repeated every four subframes. This is because the least common multiple of HARQ 8 ms and the cycle 10 ms of a radio frame is 40 ms. Furthermore, in the case where the subframe index of a subframe to which the fake subframe 161 is first allocated is an even number, the fake subframe 161 is allocated to a subframe having a subframe index of an even number. In contrast, in the case where the subframe index of a subframe to which the fake subframe 161 is first allocated is an odd number, the fake subframe 161 is allocated to a subframe having a subframe index of an odd number.

In the case where an FDD method is used in LTE, the above fake subframe is not allocated to subframes having subframe indices of 0, 4, 5, and 9 within a 10 ms radio frame (hereinafter referred to as a restriction subframe, for convenience sake) for pieces of essential information transmission, such as synchronization signals (i.e., primary/secondary synchronization signals), primary BCH transmission, and system information. However, if the allocation cycle of the fake subframe is set to 8 ms in order to make the allocation cycle identical to the HARQ cycle of LTE-A as shown in FIG. 16, it is against the above-described restriction.

In order to solve the problem, a BS may change the HARQ cycle and allocate the fake subframe based on the changed HARQ cycle.

Figure 18:
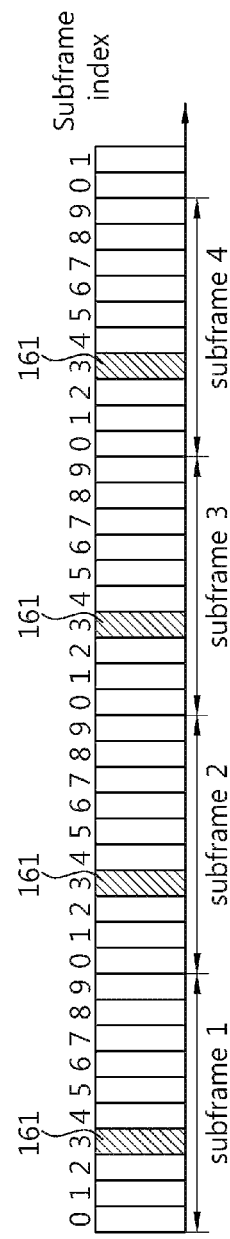
FIG. 18 shows an example in which a fake subframe is allocated according to a changed HARQ cycle by changing the HARQ cycle according to an embodiment of the present invention.

FIG. 18 shows an example in which a fake subframe is allocated according to a changed HARQ cycle by changing the HARQ cycle according to an embodiment of the present invention.

In LTE-A, the HARQ cycle is 8 ms. That is, retransmission for signal transmission is performed at the cycle of 8 ms. The HARQ cycle may be changed to 10 ms. From a viewpoint that one radio frame consists of 10 ms (i.e., 10 subframes), the HARQ cycle may be changed to 10 ms. Furthermore, the allocation cycle of the fake subframe is matched with the changed HARQ cycle. As shown in FIG. 18, since a subframe index to which the fake subframe is allocated can be fixed, specific subframes, such as 0, 4, 5, and 9, can always be avoided.

In this case, an ACK/NACK RTT (i.e., the time that an ACK/NACK signal for signal transmission is received) may be set to 4 ms, and a feedback allocation method can be used without changed upon the existing uplink ACK/NACK transmission. In an alternative, the ACK/NACK RTT may be set to 5 ms. In this case, the ACK/NACK RTT may be transmitted through a PUSCH because resource allocation may be problematic in a PUCCH.

In order to solve the above problem, a method of changing the restriction subframe to which the fake subframe cannot be allocated may be used.

Figure 19:
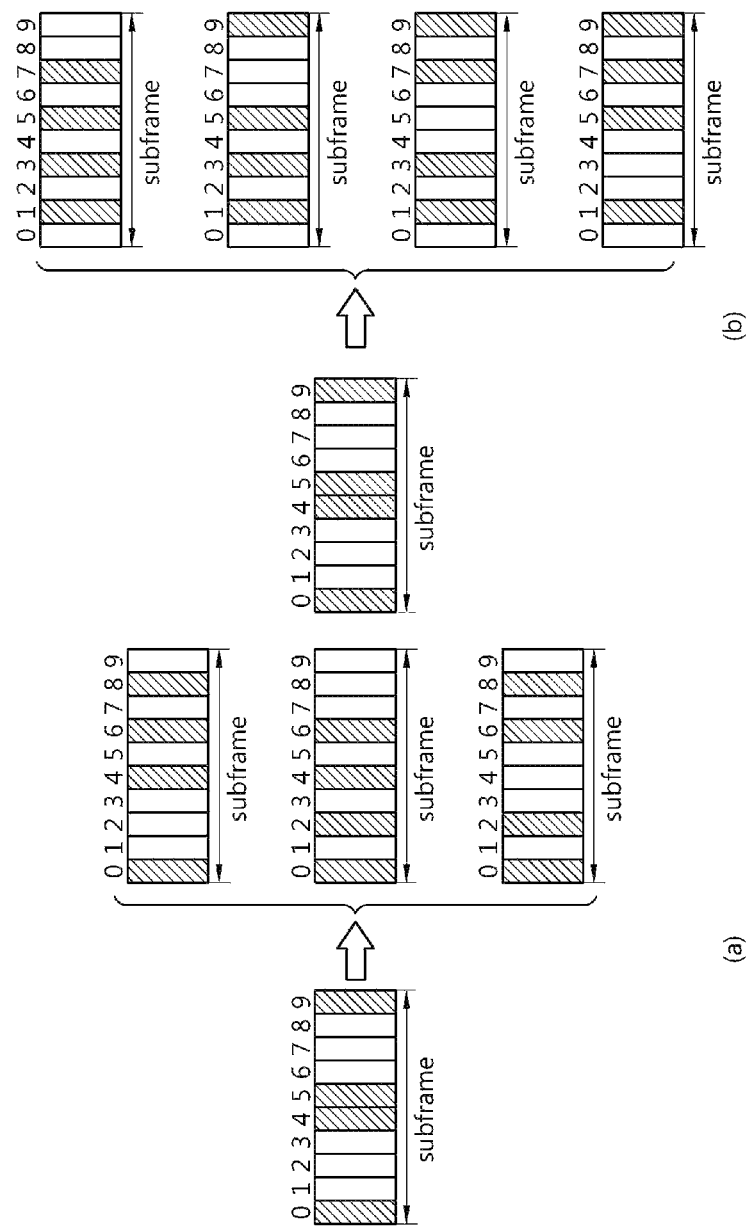
FIG. 19 shows an example in which a restriction subframe to which a fake subframe cannot be allocated is changed according to another embodiment of the present invention.

FIG. 19 shows an example in which a restriction subframe to which a fake subframe cannot be allocated is changed according to another embodiment of the present invention.

As described above, a BS transmits essential information (e.g., primary/secondary synchronization signals) to a UE. Accordingly, when the FDD method is used, the restriction subframes to which the fake subframe cannot be allocated are subframes having subframe indices of 0, 4, 5, and 9. The restriction subframes may be changed to subframes having the same subframe index of an even number (including 0) as shown in (a) of FIG. 19. For example, the restriction subframe nay be changed to any one of subframes having subframe indices {0,4,6,8}, {0,2,4,6}, and {0,2,6,8}. In an alternative, as shown (b) of FIG. 19, the restriction subframes may be changed to subframes having subframe indices of an odd number. For example, the restriction subframe may be changed to any one of subframes having subframe indices of {1,3,5,7}, {1,3,5,9}, {1,3,7,9}, and {1,5,7,9}.

When the HARQ RTT is 8 ms, the fake subframe is allocated to a subframe having a subframe index of an odd number, and HARQ retransmission for data transmitted in the subframe is performed in a subframe having a subframe index of an odd number. (e.g., the subframe 1 of a radio frame 1→the subframe 9 of the radio frame 1→the subframe 7 of a radio frame 2→the subframe 5 of a radio frame 3). In contrast, a fake subframe is allocated to a subframe having a subframe index of an even number, and HARQ retransmission for data transmitted in the subframe is performed in a subframe having a subframe index of an even number. (e.g., the subframe 2 of a radio frame 1→the subframe 0 of a radio frame 2 the subframe 8 of the radio frame 2→the subframe 6 of a radio frame 3). A restriction subframe is set as a subframe having an odd-numbered subframe index, a fake subframe is allocated to a subframe having an even-numbered subframe index, and HARQ transmission is then performed. In this case, the fake subframe can be prevented from being allocated to the restriction subframe. Likewise, a restriction subframe is set as a subframe having an even-numbered subframe index, a fake subframe is allocated to a subframe having an odd-numbered subframe index, and HARQ transmission is then performed. In this case, the fake subframe can be prevented from being allocated to the restriction subframe.

Alternatively, in the case where a fake subframe is allocated to a restriction subframe, a method of a BS informing LTE UEs that pieces of essential information, such as synchronization signals (i.e., primary/secondary synchronization signals), a PBCH, and system information, are not transmitted in a restriction subframe is possible. For example, in the case where an RS received in a restriction subframe is different from an RS according to LTE, a method of a BS informing LTE UEs that the pieces of essential information are not transmitted in a next four radio frame sections.

Figure 20:
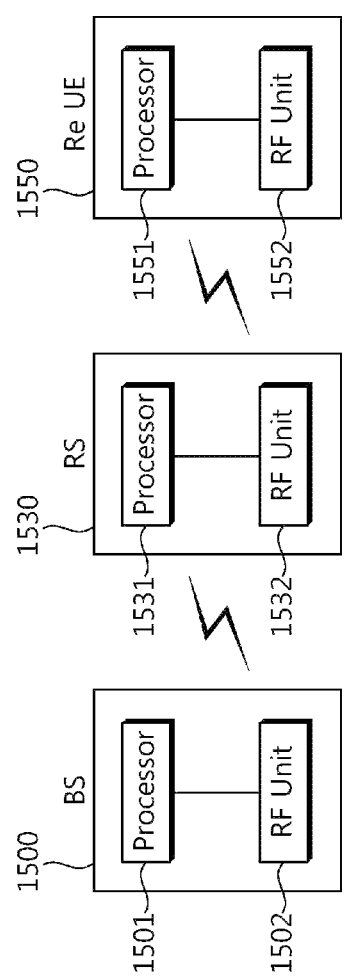
FIG. 20 is a block diagram showing a wireless communication system in which the embodiment of the present invention may be implemented.

FIG. 20 is a block diagram showing a wireless communication system in which the embodiment of the present invention may be implemented. A BS 1500, a Relay Station (RS) 1530, and a UE 1550 perform communication through respective radio channels.

The BS 1500 includes a processor 1501 and an RF unit 1502. The RF unit 1502 transmits and/or receives radio signals. The processor 1501 is connected to the RF unit 1502 and is configured to transmit data to the RS 1530. The processor 1501 implements the radio resource allocation method for a subframe according to the above-described embodiments.

The relay station 1530 includes a processor 1531 and an RF unit 1532. The RF unit 1532 transmits and/or receives radio signals. The processor 1531 is connected to the RF unit 1532 and is configured to relay data, received from the BS 1500, to the UE 1550. The processor 1531 implements the radio resource allocation method for a subframe according to the above-described embodiments.

The UE 1550 includes a processor 1551 and an RF unit 1552. The RF unit 1552 transmits and/or receives radio signals. The processor 1551 is connected to the RF unit 1552 and is configured to receive data from the BS 1500 or the relay station 1530 and demodulate and decode the data.

The present invention may be implemented using hardware, software, or a combination of them. In hardware implementations, the present invention may be implemented using ASICs (Application Specific Integrated Circuits), DSPs (Digital Signal Processors), PLDs (Programmable Logic Devices), FPGAs (Field Programmable Gate Arrays), processors, controllers, microprocessors, other electronic units, or a combination of them, which are designed to perform the above-described functions. In software implementations, the present invention may be implemented using modules performing the above-described functions. Software may be stored in a memory unit and executed by a processor. The memory unit or the processor may adopt various means well known to those skilled in the art.

Although the embodiments of the present invention have been described above, those having ordinary skill in the art will appreciate that the present invention may be modified in various forms without departing from the spirit and scope of the present invention defined in the appended claims. Accordingly, a possible change of the embodiments of the present invention may not deviate from the technology of the present invention.

The invention claimed is:

1. A radio resource allocation method for a subframe, the subframe comprising a plurality of orthogonal frequency division multiplexing(OFDM) symbols in a time domain and a plurality of subcarriers in a frequency domain, the radio resource allocation method comprising:

allocating a first control channel to a first control zone in the subframe based on a first RAT (Radio Access Technology);

allocating a second control channel to a second control zone in the subframe based on a second RAT; and allocating a data channel to a data zone, the data zone including OFDM symbols placed other than the first control zone and the second control zone in the subframe, wherein the first control zone and the second control zone do not overlap each other in the time domain, wherein the first control zone comprises a first number of OFDM symbols, the first number being indicated by a PCFICH (Physical Control Format Indicator Channel) included in the first control zone, wherein the second control zone comprises a second number of OFDM symbols, the second number being indicated by a radio resource control (RRC) message.

2. The method of claim 1, wherein:

the first number is applied to the subframe; and the second number is applied to a plurality of subframes including the subframe.

3. The method of claim 1, wherein the RRC message is transmitted through the data channel.

4. The method of claim 1, wherein the PCFICH is placed in a specific zone fixed within the first control zone.

5. The method of claim 1, further comprising allocating a reference signal based on the second RAT to a specific frequency band on one or more OFDM symbols among OFDM symbols included in the second control zone or the data zone.

6. The method of claim 1, wherein the second control zone comprises a plurality of subzones separated from each other in the time domain.

7. The method of claim 1, wherein each of the first number and the second number is a natural number less than or equal to 3.

8. A base station, comprising:

a Radio Frequency (RF) unit configured to transmit and receive radio signals; and a processor connected to the RF unit, wherein the processor, in a subframe comprising a plurality of OFDM symbols in a time domain and a plurality of subcarriers in a frequency domain, is configured to:

allocate a first control channel to a first control zone in the subframe based on a first RAT (Radio Access Technology);

allocate a second control channel to a second control zone in the subframe based on a second RAT; and allocate a data channel to a data zone, the data zone including OFDM symbols placed other than the first control zone and the second control zone in the subframe, wherein the first control zone and the second control zone do not overlap each other in time domain, wherein the first control zone comprises a first number of OFDM symbols, the first number being indicated by a PCFICH (Physical Control Format Indicator Channel) included in the first control zone, wherein the second control zone comprises a second number of OFDM symbols, the second number being indicated by a radio resource control (RRC) message.

* * * * *